US012803831B2

(12) United States Patent
Hughes, Jr. et al.

(10) Patent No.: US 12,803,831 B2
(45) Date of Patent: Nov. 17, 2026

(54) PROCESSING CONFERENCE MULTIMEDIA DATA

(71) Applicant: Zoom Communications, Inc., San Jose, CA (US)

(72) Inventors: William Robert Hughes, Jr., Alpharetta, GA (US); Sumitha Pillutla, San Francisco, CA (US); Nicholas Alexander Sieracki, Sylmar, CA (US); Michael Adrian White, Alpine, UT (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/946,204

(22) Filed: Nov. 13, 2024

(65) Prior Publication Data

US 2025/0337605 A1 Oct. 30, 2025

Related U.S. Application Data

(60) Provisional application No. 63/639,585, filed on Apr. 27, 2024.

(51) Int. Cl.
*H04L 12/18* (2006.01)
*G06F 40/40* (2020.01)
*G10L 15/26* (2006.01)

(52) U.S. Cl.
CPC .......... *H04L 12/1813* (2013.01); *G06F 40/40* (2020.01); *G10L 15/26* (2013.01)

(58) Field of Classification Search
None
See application file for complete search history.

(56) References Cited

U.S. PATENT DOCUMENTS

| | | | | |
|---|---|---|---|---|
| 10,650,244 | B2 | 5/2020 | Meisser et al. | |
| 2014/0267560 | A1* | 9/2014 | Bright-Thomas | H04N 19/88 348/14.08 |
| 2017/0013233 | A1* | 1/2017 | Kuusela | H04N 7/15 |
| 2023/0125307 | A1* | 4/2023 | O'Connell | G10L 17/04 704/231 |
| 2023/0247069 | A1* | 8/2023 | Khire | H04L 65/403 348/14.08 |
| 2023/0267343 | A1 | 8/2023 | Tater et al. | |
| 2024/0005085 | A1 | 1/2024 | Kukde et al. | |
| 2024/0073322 | A1 | 2/2024 | Jorasch et al. | |
| 2024/0098184 | A1* | 3/2024 | Burd | H04M 3/567 |
| 2024/0347064 | A1* | 10/2024 | Li | G06F 40/35 |

OTHER PUBLICATIONS

International Search Report and Written Opinion mailed on Jun. 24, 2025 in corresponding PCT Application No. PCT/US2025/025127.
Descript Help, Recording Zoom meetings with separate audio tracks, <https://help.descript.com/hc/en-us/articles/10636562032653-Recording-Zoom-meetings-with-separate-audio-tracks> Retrieved from Internet Aug. 28, 2023, 6 pages.

* cited by examiner

*Primary Examiner* — Fadi Haj Said
(74) *Attorney, Agent, or Firm* — Young Basile Hanlon & MacFarlane, P.C.

(57) ABSTRACT

A conferencing server obtains streaming multimedia data associated with a conference. The conferencing server obtains a request for a portion of the streaming multimedia data from an external server. The request identifies the portion and a format for the portion. The conferencing server transmits, to the external server and during the conference, the portion of the streaming multimedia data in the format.

21 Claims, 16 Drawing Sheets

PROCESSING CONFERENCE MULTIMEDIA DATA

PRIORITY CLAIM

This application claims the benefit of U.S. Provisional Patent Application No. 63/639,585, filed on Apr. 27, 2024, titled "PROCESSING CONFERENCE MULTIMEDIA DATA," the entire disclosure of which is incorporated herein by reference. This application is related to U.S. patent application Ser. No. 18/474,769, filed on Sep. 26, 2023, titled "PREPROCESSING CONFERENCE AUDIO DATA," the entire disclosure of which is incorporated herein by reference.

FIELD

This disclosure relates to processing conference multimedia data. The multimedia data may be transmitted to an external server in a format specified by the external server.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
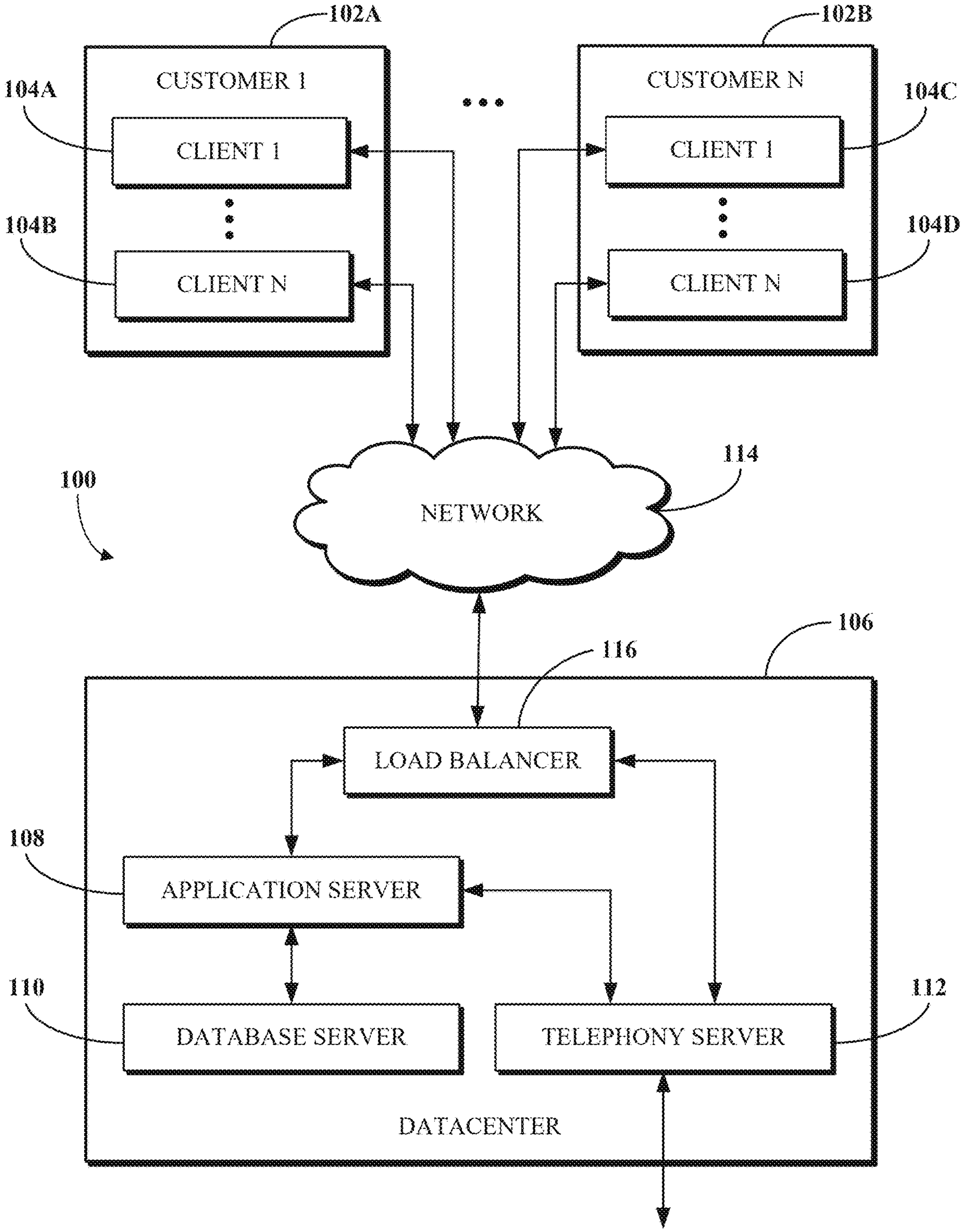
FIG. 1 is a block diagram of an example of an electronic computing and communications system.

Conferencing software is frequently used across various industries to support video-enabled conferences between participants in multiple locations. In some cases, each of the conference participants separately connects to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct conferences without requiring them to be physically present with one another. Conferencing software may be available as a standalone software product or it may be integrated within a software platform, such as a unified communications as a service (UCaaS) platform.

Automated processing of recorded conferencing data, for example, for transcription, artificial intelligence (AI) inference, or machine learning (ML) inference may be desirable. Having a conference automatically transcribed may be advantageous, for example, to allow participants in the conference to quickly access what was said. In addition, with appropriate permissions being provided by the participants of the conference, data from the conference may be used in inference by AI/ML technology. For example, in a sales conference (or a contact center engagement where a proposed sale is discussed), AI/ML technology may be used to provide real-time feedback to the salespersons, evaluating the likelihood that a deal would close and/or providing suggestions for the salespersons to address feedback on the deal provided by counterparties. Such AI/ML technology may be trained using reinforcement learning and/or using supervised learning.

According to some schemes, devices connect to a conferencing server to engage in a conference. Upon notifying the users of the devices and obtaining their consent, the conferencing server may begin to generate a recording (e.g., an audio recording or a video recording) of the conference during the conference. After the conference is completed, the conferencing server provides the complete recording to a consumer server, which processes the recording, for example, for transcription or AI/ML use cases. Drawbacks of these schemes include that the processing occurs after the conference is over, not in real-time during the conference. As a result, real-time feedback cannot be provided using AI/ML and a real-time transcript might not be available. A real-time transcript may be useful, for example, to assist a participant who joins the conference late in learning what was already discussed. Furthermore, the recording generated using these schemes might not associate each audio (or video) payload with a speaker or a device that provided the audio. As the foregoing illustrates, improved techniques for preprocessing conference recording data for use by a consumer server may be desirable.

Implementations of this disclosure address problems such as these by preprocessing, at a conferencing server that may be operated by a conferencing service provider, conferencing data prior to provision to a consumer server. The consumer server may be operated by an entity different from the conferencing service provider. In one non-limiting example use case, the consumer server may be operated by a university that uses conferences for online learning or by a car dealership that that engages in conferences with potential car buyers. Alternatively, the consumer server may be operated by the conferencing service provider. The preprocessed data may be used, at the consumer server, for various use cases, such as transcription or AI/ML use cases.

The conferencing server receives audio data from devices connected to a conference. The audio data may include audio data only or the audio data may be transmitted in conjunction with imagery (e.g., one or more video frames of the conference, including at least one of camera-generated imagery or screensharing imagery) in a video conference. The conferencing server generates multiple time-contiguous containers (e.g., lasting up to 250 milliseconds (ms) each). Each time-contiguous container is associated with a time range, and the time ranges of the multiple time-contiguous containers are mutually exclusive and collectively exhaustive. Each time-contiguous container includes an identification of a speaker device and includes audio payloads, with each audio payload being from the speaker device and lasting for a predetermined amount of time (e.g., 10 ms). The conferencing server transitions between containers in response to at least one of: detecting audio (e.g., at a volume exceeding a threshold volume) from a device different from the speaker device, a predetermined number of payloads (e.g., 25) being generated in the current container, or a passage of a time period (e.g., 250 ms) since the beginning of the current container. After each container is generated, the conferencing server transmits the generated container to the consumer server for processing thereat. The consumer server may use the received containers to perform at least one of transcribing the conference or AI/ML inference.

A conference may be conducted by multiple client devices connected to a conferencing server. Some AI or ML software may be implemented at the conferencing server. However, in some cases, an entity using the conferencing server (e.g., a business customer of a telecommunications company that operates the conferencing server) may desire to implement AI or ML technology on an external server operated by the entity, thereby avoiding sharing data with the conferencing server. The AI or ML technology may be implemented in real-time during the conference (e.g., for transcription, closed captioning, or real-time analysis of the conference) For example, a healthcare company may desire to implement AI or ML technology in a Health Insurance Portability and Accountability Act (HIPAA) compliant manner. A financial services company may desire to implement AI or ML technology in a manner that protects end-user privacy. In order to implement the AI or ML technology at the external server in real-time during the conference, a subset of the streaming multimedia data generated during the conference may be transmitted from the conferencing server to the external server. In some cases, the subset might not include all of the streaming multimedia data to avoid overwhelming the AI or ML software with excessive amounts of data. Techniques for identifying and transmitting the subset of the streaming multimedia data may be desirable.

According to some implementations, a conferencing server obtains streaming multimedia data from client devices during a conference. The streaming multimedia data may include at least one of audio data, visual data, audio-visual data, text data, or data associated with user or client device interaction with conferencing software. The visual data may include at least one of camera-generated visual data, screensharing visual data, or virtual background visual data. The text data may be in-conference text-based chat data. The data associated with user or client device interaction may include data of the user using input/output devices, data of the user interacting with the conferencing software on the client device, or data associated with hardware of the client device executing the conferencing software. The conferencing server receives, from an external server, a request for a portion of the streaming multimedia data. The request identifies the portion and a format for the portion. For example, if the external server is providing a transcription service or a closed captioning service, the request may be for audio frames and the format may specify a frame size (e.g., 25 milliseconds) and a time-spacing between successive frame start points (e.g., 10 milliseconds). The conferencing server generates data in the format specified in the request. The conferencing server transmits, to the external server and during the conference, the portion of the streaming data in the format.

To enhance privacy and safety, as well as provide other benefits, the artificial intelligence models and/or machine learning models discussed herein may be trained using one or more commercially available data sets that do not contain recorded conferencing data.

In some examples of the present disclosure, implementations may include or otherwise use one or more AI/ML systems having one or more models trained for one or more purposes. Use or inclusion of such AI/ML systems, such as for implementation of certain features or functions, may be turned off by default, where a user, an organization, or both must opt-in to utilize the features or functions that include or otherwise use an AI/ML system. User or organizational consent to use the AI/ML systems or features may be provided in one or more ways, for example, as explicit permission granted by a user prior to using an AI/ML feature, as administrative consent configured by administrator settings, or both. Users for whom such consent is obtained can be notified that they will be interacting with one or more AI/ML systems or features, for example, by an electronic message (e.g., delivered via a chat or email service or presented within a client application or webpage) or by an on-screen prompt, which can be applied on a per-interaction basis. Those users can also be provided with an easy way to withdraw their user consent, for example, using a form or like element provided within a client application, webpage, or on-screen prompt to allow individual users to opt-out of use of the AI/ML systems or features.

To enhance privacy and safety, as well as provide other benefits, the AI/ML processing system may be prevented from using a user's or organization's personal information (e.g., audio, video, chat, screen-sharing, attachments, or other communications-like content (such as poll results, whiteboards, or reactions)) to train any AI/ML models and instead only use the personal information for inference operations of the AI/ML processing system. Instead of using the personal information to train AI/ML models, AI/ML models may be trained using one or more commercially licensed data sets that do not contain the personal information of the user or organization.

To describe some implementations in greater detail, reference is first made to examples of hardware and software structures used to implement a system for preprocessing conference audio data. The conference audio data may be a component of the conference multimedia data. The multimedia data may include the audio data. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
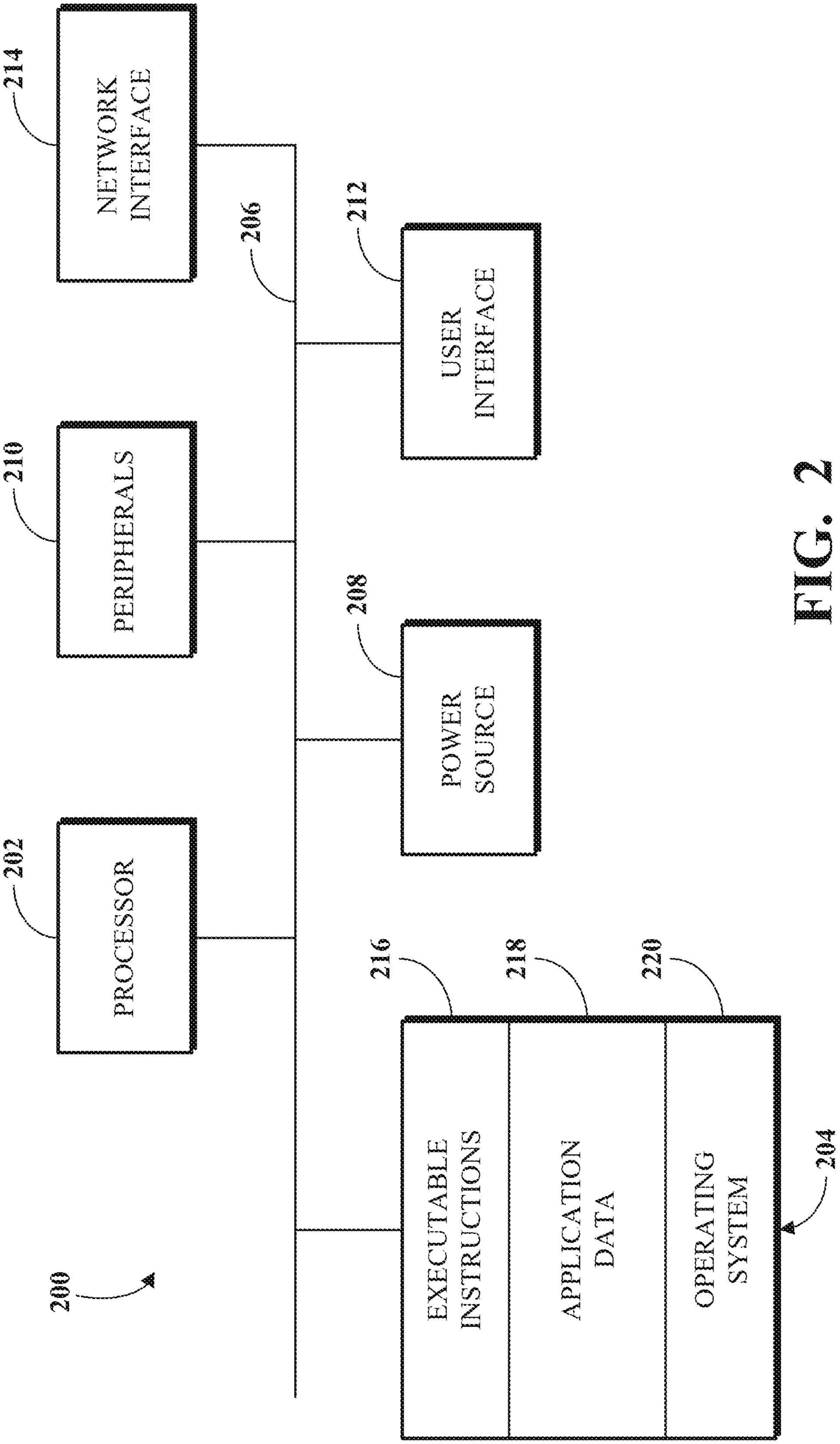
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
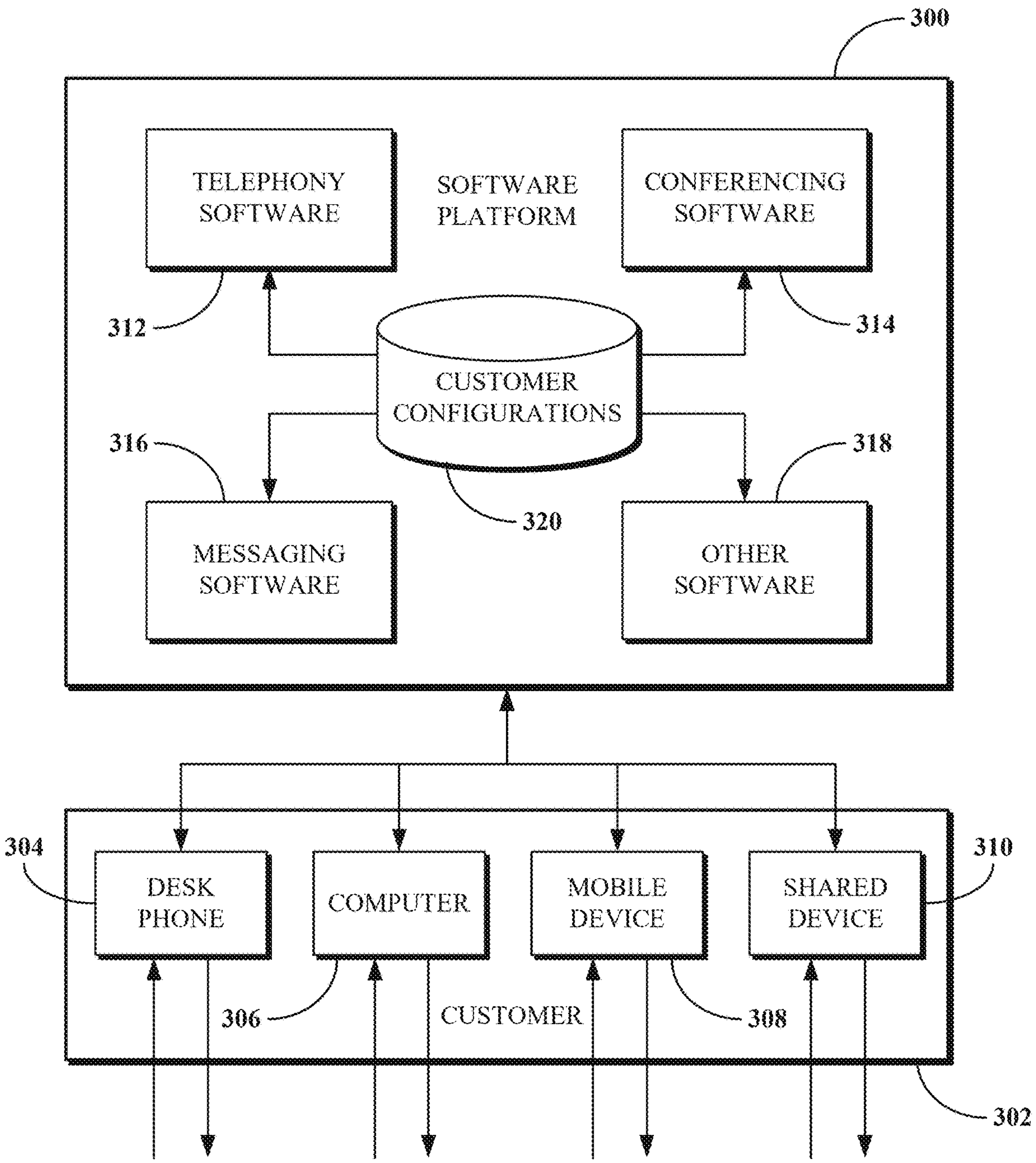
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients and other telephony-enabled devices, which may be other ones of the clients, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for preprocessing conference multimedia (e.g., audio) data or software for processing the conference multimedia (e.g., audio) data in transcription or AI/ML use cases. In some such cases, the conferencing software 314 can include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients.

Figure 4:
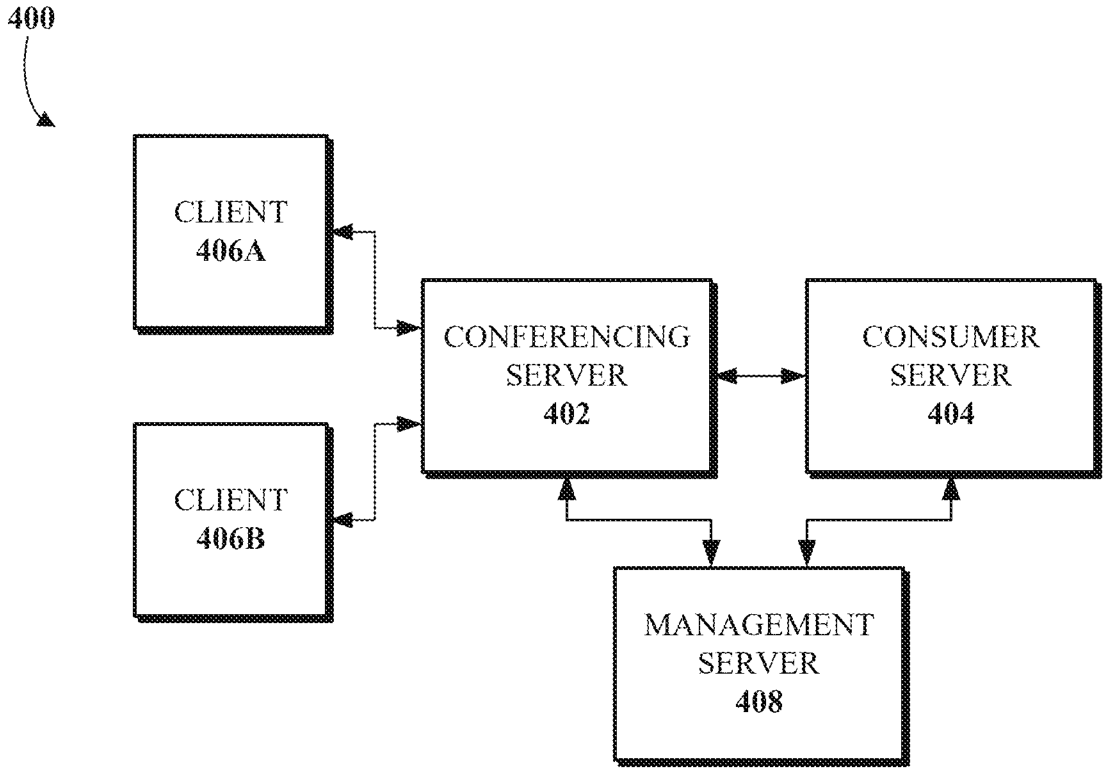
FIG. 4 is a block diagram of an example of a conferencing system.

FIG. 4 is a block diagram of an example of a conferencing system 400. As shown, the conferencing system include a conferencing server 402, a consumer server 404, clients 406A and 406B, and a management server 408. The conferencing server 402 may include the conferencing software 314 and/or may correspond to the application server 108 or the telephony server 112. The consumer server 404 may correspond to the application server 108 or the database server 110. The clients 406A and 406B may correspond to the clients 104A-D. The management server 408 may correspond to the application server 108.

According to some implementations, the clients 406A and 406B engage in a conference (e.g., a voice conference or a video conference) via the conferencing server 402. The conferencing server 402 may support transmission of at least one of audio data, camera-generated video data, or screen-sharing video data between the clients 406A and 406B. While two clients 406A and 406B are illustrated and described by example, the disclosed technology may be implemented with other numbers of clients. As used herein, the term "video conference" may encompass at least one of a camera-generated video conference, a screensharing video conference, a virtual reality video conference, or a whiteboard video conference.

When the conference is initiated, for example, by one of the clients 406A initiating the conference with another one of the clients 406B (e.g., by placing a voice call or a video call) or by one of the clients 406A joining a pre-scheduled conference, the conferencing server 402 transmits, to the management server 408, a signal that the conference is beginning. In response, the management server 408 transmits, to the conferencing server 402, a message indicating an address of the consumer server 404 and/or authentication data of the consumer server 404, where the consumer server 404 is to receive audio data of the conference. The authentication data may be associated with an authentication protocol. The authentication protocol may, for example, be at least one of password authentication protocol (PAP), challenge-handshake authentication protocol (CHAP), extensible authentication protocol (EAP), RADIUS, TACACS+, Kerberos, OAuth 2.0, SAML 2.0, FIDO2, or WebAuthn. The conferencing server 402 connects to the consumer server 404 using the address and/or the authentication data.

During the conference, the conferencing server 402 receives audio data from the clients 406A and 406B connected to the conference. The audio data may correspond to speech in an audio conference or speech from a device (e.g., a telephone) of the clients 406A-B that does not transmit imagery. Alternatively or in addition, the audio data may correspond to the audio component of video data received from a device of the clients 406A-B. The conferencing server 402 generates multiple time-contiguous containers. Each time-contiguous container identifies a client 406A or 406B and includes one or more payloads of the audio data from that client 406A or 406B. Each payload has a predefined time length (e.g., 10 ms). The time-contiguous containers may be mutually exclusive and/or collectively exhaustive with respect to times in the conference when speech is detected by the conferencing server (i.e., each moment in time when speech is detected is associated with one and only one of the time-contiguous containers). The conferencing server 402 may terminate a current time-contiguous container and begin generating a new time-contiguous container after a threshold number of payloads (e.g., 25 payloads) are generated in the current time-contiguous container or after audio is detected from a client (e.g., the client 406A) different from the identified client (e.g., the client 406B) of the current time-contiguous container. More details of how the time-contiguous containers are generated and used are provided below. The conferencing server may use natural language processing (NLP) or natural language detection technology to detect or identify natural language speech and to detect the times when natural language speech is present.

Upon generation of each time-contiguous container, the time-contiguous container is transmitted from the conferencing server 402 to the consumer server 404. The consumer server 404 may process the received time-contiguous containers in different ways. For example, the consumer server 404 may generate a transcript of the conference based on the received time-contiguous containers. Alternatively, or in addition, the received-time contiguous containers may be used by artificial intelligence software at the consumer server 404. The consumer server 404 may be a transcription server or an artificial intelligence server. More details of examples of the conferencing server 402 to the consumer server 404 are provided in conjunction with FIG. 5.

Figure 5:
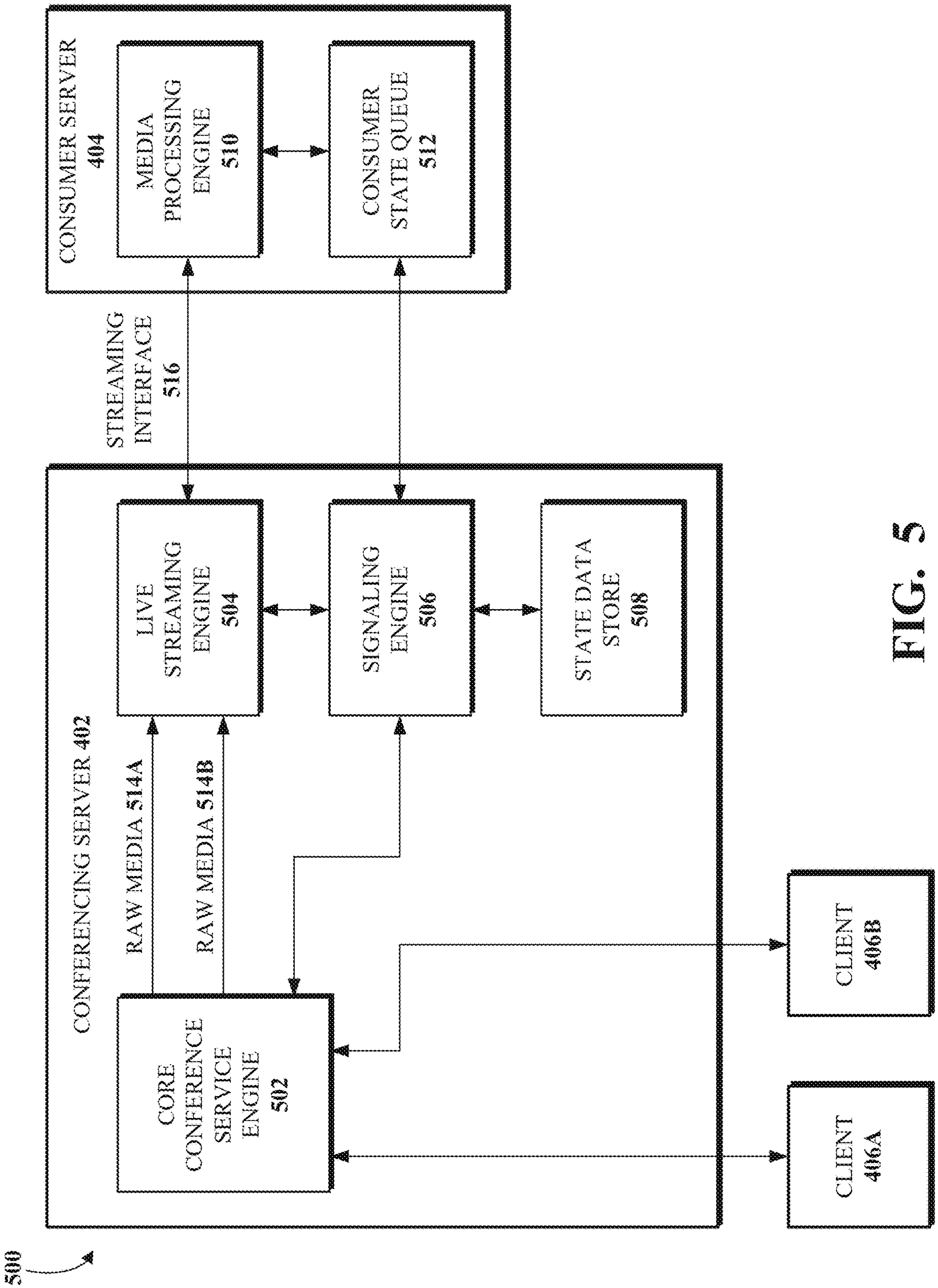
FIG. 5 is a block diagram of an example of a conferencing system for preprocessing audio data.

FIG. 5 is a block diagram of an example of a conferencing system 500 for preprocessing audio data. As shown, the conferencing system 500 includes the conferencing server 402, the consumer server 404, and the clients 406A and 406B from the conferencing system 400 of FIG. 4. As illustrated, the conferencing server 402 includes a core conference service engine 502, a live streaming engine 504, a signaling engine 506, and a state data store 508. The consumer server 404 includes a media processing engine 510 and a consumer state queue 512.

The core conference service engine 502 receives media (e.g., audio or video) from the client 406A and transmits the media to the client 406B. Similarly, the core conference service engine 502 receives media from the client 406B and transmits the media to the client 406A. As illustrated, the core conference service engine 502 transmits raw media 514A from the client 406A to the live streaming engine 504. Similarly, the core conference service engine 502 transmits raw media 514B from the client 406B to the live streaming engine 504. The media (e.g., the raw media 514A and the raw media 514B) from the clients 406A and 406B are also transmitted to the signaling engine 506. The raw media 514A and/or the raw media 514B may include audio data and/or video data, with the video data including audio and imagery. In some cases, the raw media 514A may include audio without imagery and the raw media 514B may include video with audio and imagery (or vice versa). This may occur for devices with video capture disabled or without video capture functionality, for example, if the client 406A is a telephone, a computer lacking a camera, or a computer with the camera disabled.

During the conference, the signaling engine 506, working in conjunction with the media processing engine 510, identifies the client 406A or 406B that is generating audio for storage. The client 406A or 406B that is generating audio for storage may be identified based on the volume level of the audio from the clients 406A-B. Alternatively, the client 406A or 406B may be identified using speech or language detection. For example, if the client 406A is generating audio including a human voice, while the client 406B is generating audio including white noise, then the client 406A is identified as the client that is generating audio for storage. In some cases, the client 406A may have a single speaker while the client 406B may have multiple speakers in the background (e.g., due to being located in a building lobby or in a coffee shop). As a result, the client 406A may be identified as the client that is generating audio for storage. The media processing engine 510 may distinguish between audio including a single speaker, audio including multiple speakers in the background, and white noise using artificial intelligence technology that is trained by supervised learning based on a labeled dataset of audio files. According to some implementations, the signaling engine 506 is not directly aware of media characteristics. Instead, this function may be handled by the media processing engine 510. It should be noted that the labeled dataset of audio files is preferably not the audio for storage or the recorded conferencing data. Some implementations do not use conference recordings, transcripts, or user data to train artificial intelligence and/or machine learning models.

Upon identification of the client 406A or 406B generating audio for storage, the signaling engine stores an identifier of that client (along with an identifier of the current time) in the state data store 508. The signaling engine 506 notifies the live streaming engine 504 of that client. The raw media 514A or 514B (e.g., including audio or video) from that client is stored in a container (e.g., as described in conjunction with FIG. 6 below) provided, via a streaming interface 516, to the media processing engine 510 of the consumer server 404.

The signaling engine 506 also notifies the consumer state queue 512 of the client 406A or 406B generating audio for storage. The consumer server 404 may leverage the consumer state queue 512 to verify that the correct containers are being received from the conferencing server 402.

Upon identifying (e.g., at the beginning of the conference or at another point of the conference) that the client 406A is generating audio for storage, the live streaming engine 504 places the raw media 514A from the client 406A into payloads of a container, where each payload includes a fixed time length (e.g., 10 ms) of audio. The container also includes an identification of the client 406A generating the audio. The client 406A may be identified by a device identifier, an account identifier (e.g., of an account being used to access the client 406A) or a user identifier (e.g., of a user logged in to the client 406A). After the passage of a certain amount of time (e.g., 250 ms), generating a certain number of payloads (e.g., 25 payloads) or determining that another client 406B is generating audio for storage, the client 406A terminates generation of the container and initiates generation of a new container.

Figure 6:
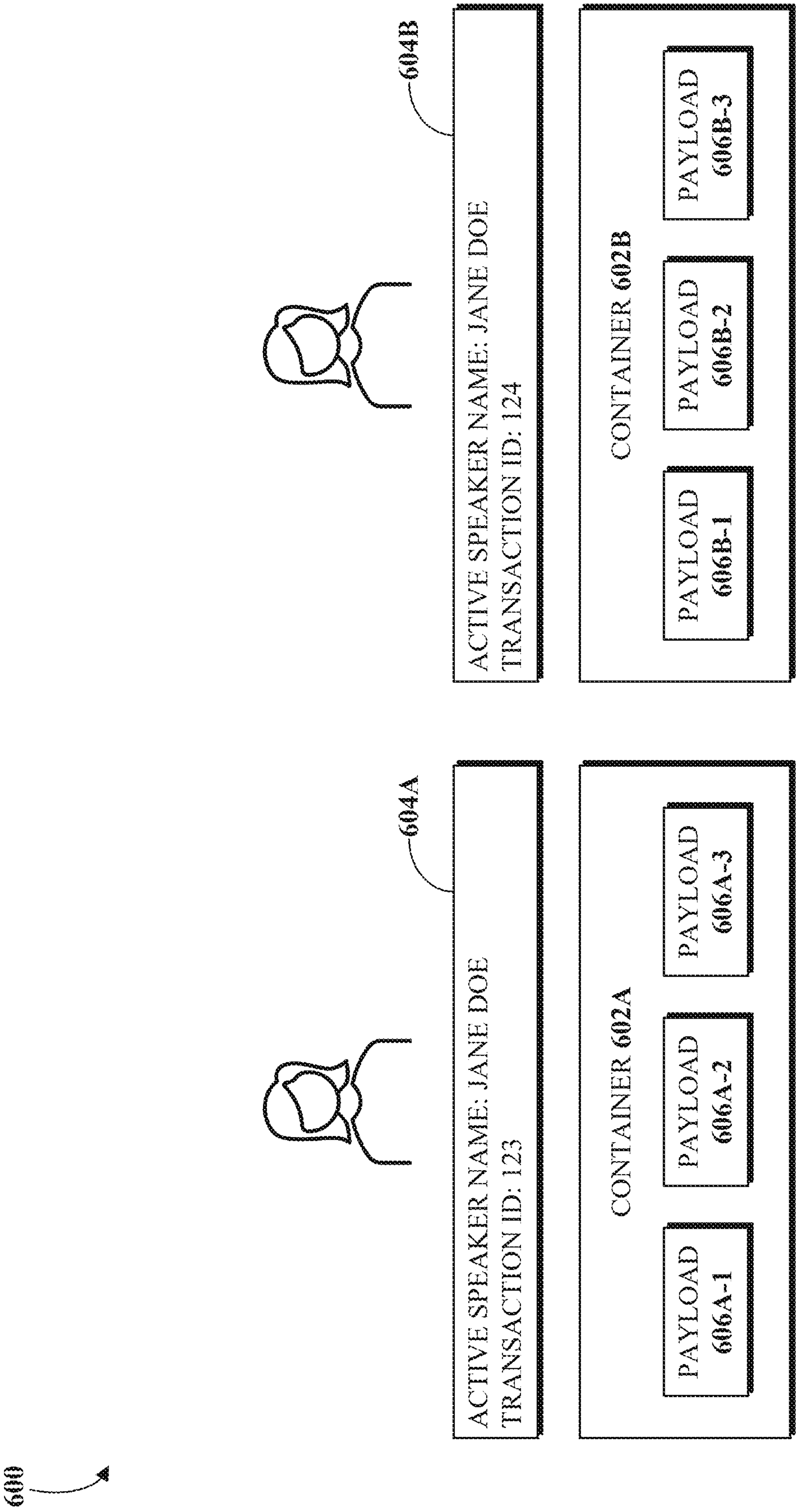
FIG. 6 is a block diagram of an example of a data plane for preprocessing conference audio data.

FIG. 6 is a block diagram of an example of a data plane 600 for preprocessing conference audio data. As shown, the data plane 600 includes two containers 602A and 602B. In alternative implementations, the data plane 600 may include other numbers of containers. As illustrated, the container 602A is coupled with a metadata tag 604A and includes multiple payloads 606A-1, 606A-2, and 606A-3. While the container 602A is illustrated as including three payloads 606A, the container 602A may include other numbers of payloads. Similarly, the container 602B is coupled with a metadata tag 604B and includes multiple payloads 606B-1, 606B-2, and 606B-3. While the metadata tag 604 is illustrated as being external to the container 602, in alternative implementations, the metadata tag 604 may be included within the container 602.

As illustrated, the metadata tag 604 includes an active speaker name and a transaction identifier (ID). The transaction ID is an identifier for the container 602, allowing the consumer server 404 and/or the conferencing server 402 to uniquely identify the container 602. The active speaker name identifies the active speaker and may correspond to at least one of an identifier (e.g., a name or a username) of a person that is speaking to produce the audio data, an identifier of an account that is producing the audio data for the container 602, or an identifier of a device that is producing the audio data for the container 602. The person or the account may uniquely correspond to a user device (e.g., the client 406A or the client 406B) connected to the conference. In some cases, the active speaker name may be coupled with a stored image (e.g., a user profile image) associated with the active speaker.

Each container 602 includes one or more payloads 606 (where 606 can refer to at least one of 606A-1, 606A-2, 606A-3, 606B-1, 606B-2, or 606B-3). Each payload 606 includes a recording of a fixed time duration of audio data received from the users device. At a time after (e.g., immediately after or at another time when audio is generated) one payload 606 terminates, another payload 606 begins. For example, when the payload 606A-1 terminates, the payload 606A-2 begins. The payload 606A-2 may begin immediately after 606A-1. Alternatively, there may be a break between the payloads 606A-1 and 606A-2, for example, due to the person who is speaking pausing their speech and nobody else commences to speak.

At a certain time, a server (e.g., the conferencing server 402) generating the containers 602A and 602B terminates generating the container 602A and commences generating the container 602B. This could occur in response to generating a predetermined number of payloads in the container 602A, a passage of a preset time period since initiating generation of the container 602A, or audio from a device different from the device identified in the metadata tag 604A (e.g., the device associated with the active speaker name in the metadata tag 604A) being detected. Each container may include audio data from the device identified in the metadata tag 604A and not from other devices.

The containers 602A, 602B, and any other containers in the data plane 600 are time-contiguous containers, and each container is associated with a time range. The time ranges of the containers 602A, 602B are mutually exclusive and/or collectively exhaustive with respect to the times when audio is detected in the conference.

In some cases, the server may detect simultaneous audio from two or more devices, for example, due to two people, at two different devices, speaking simultaneously. As a result, a container may be generated that has a metadata tag identifying the two or more devices providing the simultaneous audio and includes the audio from both devices. Alternatively, one device of the two or more devices may be selected for generating audio for the container. The one device may be selected based on at least one of: the device generating audio for a currently-generated container (e.g., the person that was speaking before others interrupted them), the device generating audio for a previously-generated container, a volume of the audio data from at least one of the two or more of the devices (e.g., the person who is speaking the loudest), or stored information about a user of the at least one of the two or more of the devices (e.g., the host of the conference, the person with the highest title (e.g., the chief executive officer), or the person from a same business as the host).

In an example use case of the disclosed technology, a user named Anna engages in a conference with a user named Bob. To initiate the conference, Anna provides a link to Bob, and Anna's user device and Bob's user device connect to the conference via the link, which is associated with the conferencing server 402. Based on settings provided by Anna's employer, the consumer server 404, which is to transcribe the conference in real-time during the conference, is identified.

At the beginning of the conference, Anna says, "Hello Bob," while Bob sits on a roadside bench with street noise behind himself. The conferencing server 402 uses audio processing techniques (e.g., artificial intelligence techniques) to determine that the audio from Anna's user device includes speech, while the audio from Bob's user device includes background noise. Thus, the audio from Anna's user device is selected for generating the containers. The containers are transmitted from the conferencing server 402 to the consumer server 404, and the consumer server 404 generates the line, "Anna: Hello Bob," in the transcript.

After Anna finishes speaking, Bob says, "Hello Anna." The conferencing server determines that Anna's user device is no longer generating audio data (or that the audio data from Anna's user device lacks volume or lacks speech) and Bob's user device is generating audio data. In response, the audio from Bob's user device is used to generate the containers, as described herein. The containers are transmitted from the conferencing server 402 to the consumer server 404, and the consumer server 404 generates the line, "Bob: Hello Anna," in the transcript.

After Bob says, "Hello Anna," Bob and Anna start speaking simultaneously, with Bob saying, "Let's discuss the quarterly report," and Anna saying, "Did you get my email?" Anna speaks at a higher volume than Bob. Based on settings provided by the information technology (IT) administrator of Anna's employer, when two or more users are speaking simultaneously, the user device which is generating audio at the highest volume has its audio provided to the consumer server 404. Thus, the audio from Anna's device is placed into containers and transmitted to the consumer server 404. The consumer server generates the line "Anna: Did you get my email," in the transcript. The line, "Bob: Let's discuss the quarterly report," is not placed into the transcript. In alternative implementations, the line from Bob could have been placed into the transcript (e.g., due to Bob having spoken (by saying, "Hello Anna") immediately before this line was spoken) or a blend of the audio from Anna's user device and Bob's user device could have been placed into the transcript generated by the consumer server 404.

Figure 7:
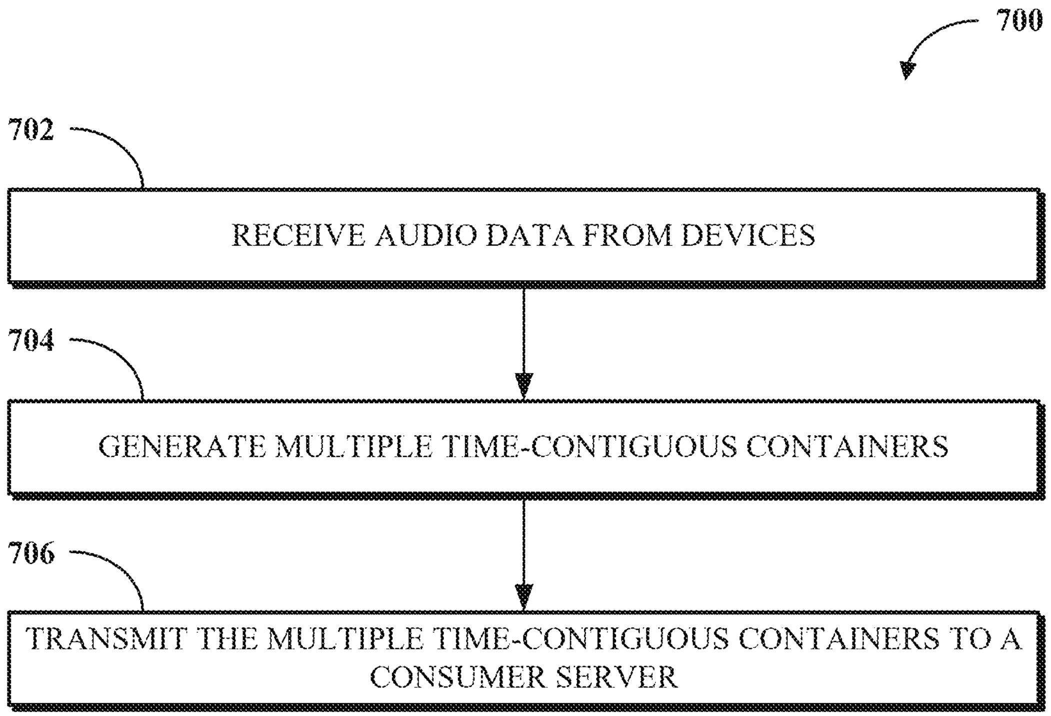
FIG. 7 is a flowchart of an example of a technique for preprocessing conference audio data at a conferencing server.
Figure 8:
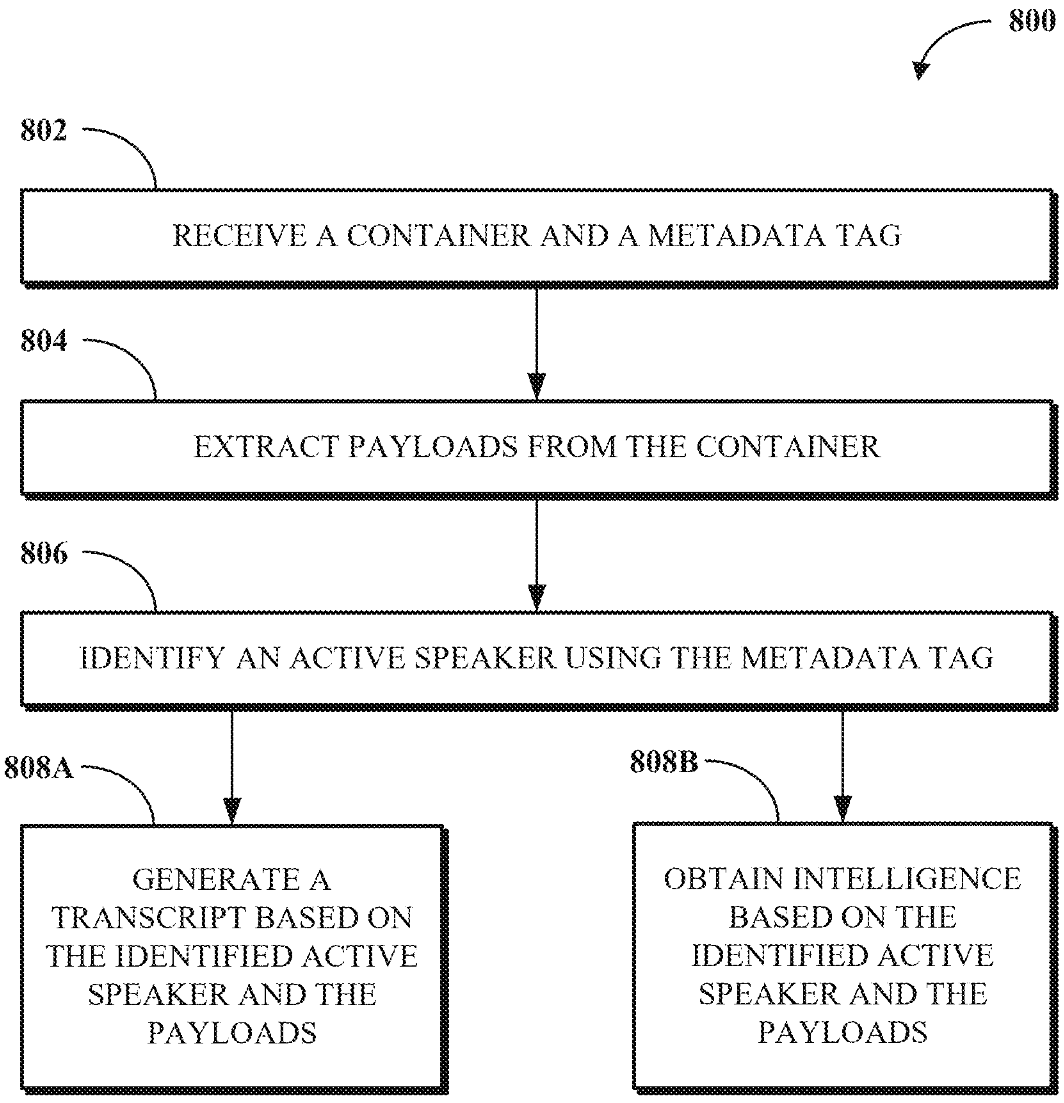
FIG. 8 is a flowchart of an example of a technique for processing conference audio data at a consumer server.
Figure 9:
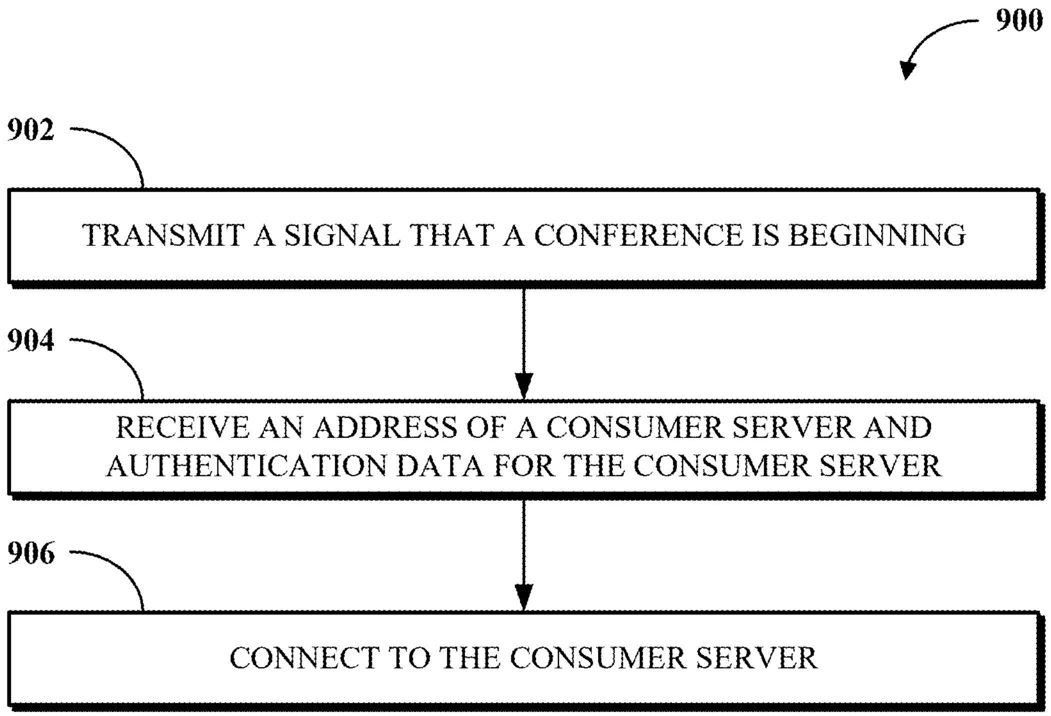
FIG. 9 is a flowchart of an example of a technique for connecting to a consumer server.
Figure 16:
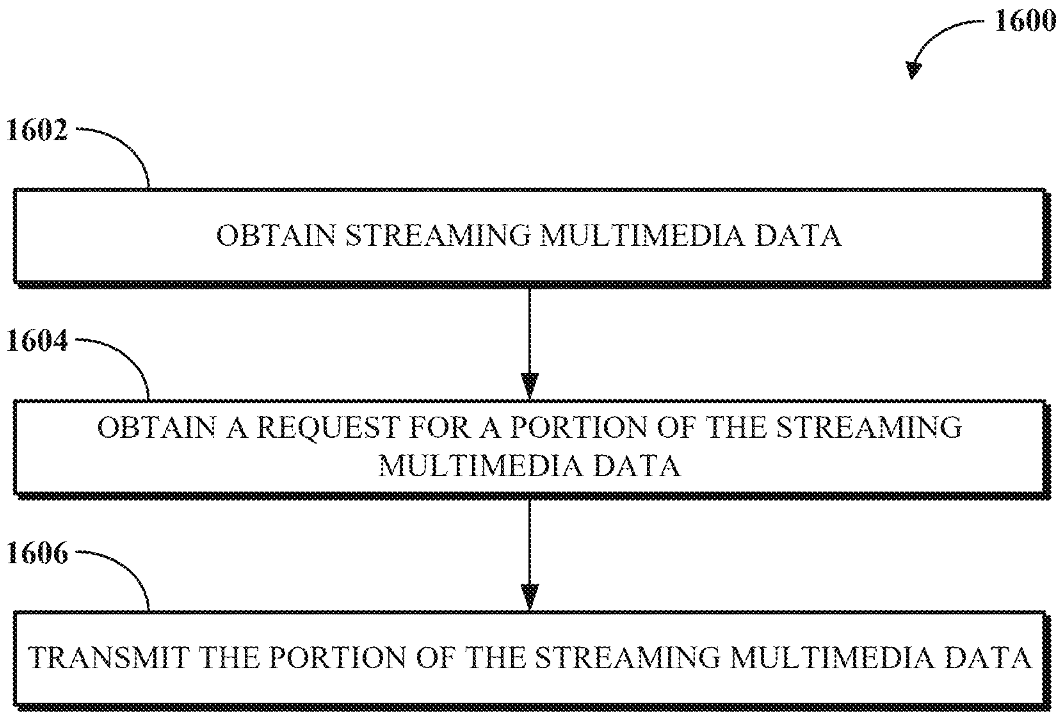
FIG. 16 is a flowchart of an example of a technique for processing conference multimedia data.

To further describe some implementations in greater detail, reference is next made to examples of techniques which may be performed by a system for preprocessing conference multimedia data (e.g., audio data). FIG. 7 is a flowchart of an example of a technique 700 for preprocessing conference audio data at a conferencing server. FIG. 8 is a flowchart of an example of a technique 800 for processing conference audio data at a consumer server. FIG. 9 is a flowchart of an example of a technique 900 for connecting to a consumer server. FIG. 16 is a flowchart of an example of a technique 1600 for processing conference multimedia data. The techniques 700, 800, 900, and/or 1600 can be executed using computing devices, such as the systems, hardware, and software described with respect to FIGS. 1-6. The techniques 700, 800, 900, and/or 1600 can be performed, for example, by executing a machine-readable program or other computer-executable instructions, such as routines, instructions, programs, or other code. The steps, or operations, of the techniques 700, 800, 900, and/or 1600 or another technique, method, process, or algorithm described in connection with the implementations disclosed herein can be implemented directly in hardware, firmware, software executed by hardware, circuitry, or a combination thereof.

For simplicity of explanation, the techniques 700, 800, 900, and/or 1600 are depicted and described herein as series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

FIG. 7 illustrates the technique 700 for preprocessing conference audio data. The technique 700 may be performed at a conferencing server (e.g., the conferencing server 402).

At 702, the conferencing server receives audio data from devices (e.g., the clients 406A and 406B) connected to a conference. The audio data may be received alone or in conjunction with imagery (e.g., as video data) or other media. The audio data may be received over a network connection and/or over a direct wired and/or wireless connection.

At 704, the conferencing server generates multiple time-contiguous containers (e.g., the containers 602A and 602B). Each time-contiguous container includes a metadata tag (e.g., the metadata tag 604A) that identifies an associated device of the devices and one or more payloads (e.g., the payloads 606A-1, 606A-2, 606A-3, 606B-1, 606B-2, and 606B-3) of the audio data from the associated device. Each payload has a predefined time length. The conferencing server transitions between time-contiguous containers (e.g., stops generating a first time-contiguous container and starts generating a second time-contiguous container) in response to at least one of generating a predetermined number of payloads in the first time-contiguous container, a passage of a preset time period since initiating generation of the first time-contiguous container, or detecting audio from a device of the devices, the device being different from the associated device.

The payloads are described above as including audio data. In some cases, the payloads may include video data with audio and imagery. In some cases, the audio or video data in the payloads may be coupled with other media (e.g., file sharing data from the conference or text messages transmitted in the conference via a chat functionality)

At 706, the conferencing server transmits the multiple time-contiguous containers to a consumer server (e.g., the consumer server 404) for processing. The consumer server may perform transcription, AI/ML inference, or other functions. Each of the multiple time-contiguous containers may be transmitted from the conferencing server to the consumer server in real-time after the time-contiguous container is generated. As a result, the consumer server may process the multiple time-contiguous containers during the conference. For example, the consumer server could generate a transcript of the conference during the conference, so that a user who joins the conference late could read the transcript and learn what was already discussed. The consumer server could generate (e.g., using NLP technology, such as a large language model (LLM) or a generative pre-trained transformer (GPT)) a written summary of what was already discussed in the conference so that the late-joining user could more quickly learn what was already discussed. Examples of operation of the consumer server are described in conjunction with FIG. 8.

FIG. 8 illustrates the technique 800 for processing conference audio data. The technique 800 may be performed at a consumer server (e.g., the consumer server 404).

At 802, the consumer server receives a container (e.g., the container 602A) and a metadata tag (e.g., the metadata tag 604A) from the conferencing server (e.g., the conferencing server 402). The container and the metadata tag may be generated at the conferencing server and transmitted to the consumer server as described in conjunction with FIG. 7. The transmission may occur in real-time after the generation of the container.

At 804, the consumer server extracts one or more payloads (e.g., the payloads 606A-1, 606A-2, and 606A-3) from the container. The container includes the one or more payloads of audio data. In some cases, at least one of the payloads may include other media in addition to the audio data.

At 806, the consumer server identifies an active speaker using the metadata tag. The active speaker may correspond to a user device (e.g., the client 406A or the client 406B) that generated the audio in the payloads. After 806, the technique 800 continues to at least one of 808A or 808B.

At 808A, the consumer server generates a transcript based on the identified active speaker and the payloads. The transcript may be generated in real-time during the conference. The transcript may be displayed within a graphical user interface of the conferencing software (or otherwise accessible to users participating in the conference via the devices connected to the conference) to assist users (e.g., users who are hard of hearing or users who are not fluent in a language spoken during the conference) in understanding what was said.

At 808B, the consumer server obtains intelligence based on the identified active speaker and the payloads. The intelligence may be obtained using an AI inference technique. For example, in a conference discussing a contemplated business-to-business sales transaction, the intelligence may predict (e.g., using GPT technology that reviews the media in the payloads including the audio data and, in some cases, imagery (e.g., including facial expressions) and the content of any files that are shared or text-based chat messaged) a likelihood that the transaction will close based on what was stated in the conference. When a buyer makes an objection or asks a question, the intelligence may include proposed responses to the objection or proposed answers to the question, allowing the salesperson to provide a high quality response in real-time, without having to do research or ask for assistance of other team members.

FIG. 9 illustrates the technique 900 for connecting to a consumer server (e.g., the consumer server 404). The technique 900 may be performed by a conferencing server (e.g., the conferencing server 402). The technique 900 may be performed before the technique 700 of FIG. 7.

At 902, the conferencing server transmits, to a management server (e.g., the management server 408), a signal that a conference is beginning. The conferencing server determines that the conference is beginning in response to a user device (e.g., one of the client 406A or 406B) connecting to a prescheduled conference via the conferencing server, a user device accessing a virtual conference room via the conferencing sever, or a user device initiating a conference (e.g., at least one of a telephone call, an audio call or a video call) with at least one other user device via the conferencing server. The conferencing server transmits the signal in response to determining that the conference is beginning.

At 904, the conferencing server receives an address of a consumer server and authentication data for the consumer server from the management server in response to the signal. The management server may identify the consumer server based on settings of a user account initiating the conference or based on settings of a user account hosting the conference. The settings may be set by an IT administrator associated with the user account. For example, an IT administrator of an accounting firm might select a transcription server as the consumer server. An IT administrator of a real estate agency might select a server running artificial intelligence technology that predicts the likelihood of a real estate transaction closing as the consumer server.

The authentication data may be associated with an authentication protocol for the consumer server. For example, if the consumer server uses PAP, the authentication data may include an identifier and a password. If the consumer server uses Kerberos, the authentication data may include at least one of a principal name (e.g., including an Internet Protocol (IP) address and a domain name), a key, or a service principal name (SPN).

At 906, the conferencing server connects to the consumer server at the address using the authentication data. The conferencing server then transmits containers generated during the conference to the consumer server per the technique 700 of FIG. 7.

Media Streaming Service (MSS) may include, among other things, a specialized conferencing media gateway which manipulates conference media/content to an appropriate format for use by third-party systems. Conference (e.g., online meeting or webinar) services use customized protocols to communicate between clients and the cloud. MSS converts the communication protocols for external distribution and streams real-time conference media content (audio/video/content/chat messages) and metadata from conference services to external (e.g., third-party) software systems. The external software systems may be associated with an entity different from an entity providing the conferencing software. It also provides a return channel for the external system to send processed data back into the conference. One use-case may be to stream real-time the audio from a conference into a specialized AI-system which can take action on the information it receives. The external system may return information via application programming interface (API) to deliver it either via in-band techniques such as audio, video or chat to interact with the conference directly; or out-of-band techniques (e.g., the information is sent to a different software system integrated with the third-party directly or via API). Some implementations of MSS support the ability for the MSS system to invoke application-layer encryption, adding an additional level of encryption to the media stream which the external system may decrypt. MSS supports multiple modes of deployment including cloud and hybrid deployments.

Figure 10:
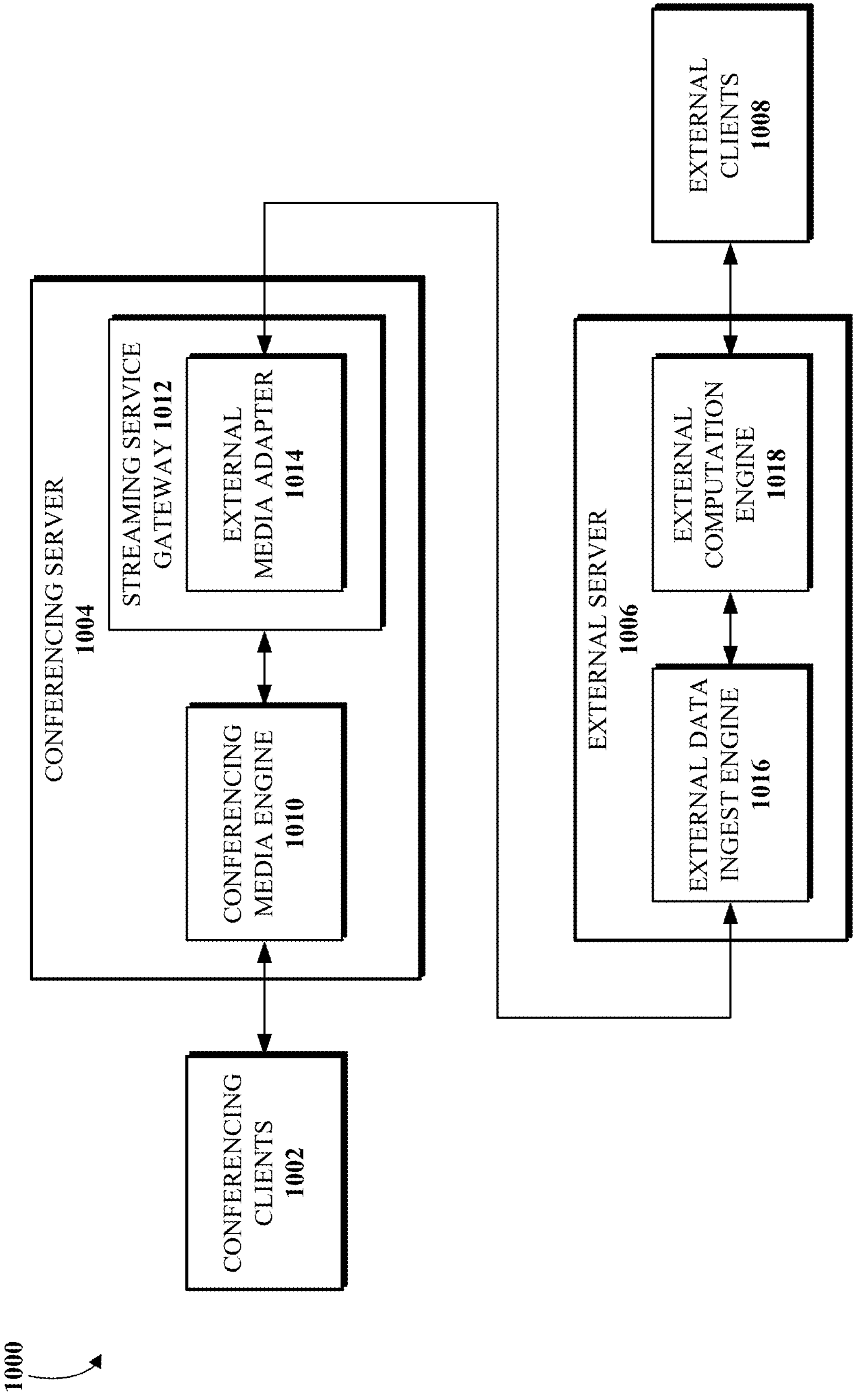
FIG. 10 is a block diagram of a first example of a system for processing conference multimedia data.

FIG. 10 is a block diagram of an example of a system 1000 for processing conference multimedia data. As shown, the system 1000 includes conferencing clients 1002, a conferencing server 1004, an external server 1006, and external clients 1008. The conferencing clients 1002 may be clients connected to a video conference and/or may correspond to at least one of the desk phone 304, the computer 306, the mobile device 308, the shared device 310, or the clients 406A-B. The conferencing server 1004 may be a server that provides conferencing services and may correspond to the conferencing server 402. The external server 1006 may be a server of an entity different from the entity that provides the conferencing server 1004. The external server 1006 may correspond to the consumer server 404. The external clients 1008 may include clients connected to the external server 1004. The eternal clients 1008 may correspond to the clients 104A-D. Each of the conferencing clients 1002 and the external clients 1008 are described herein in the plural form as including multiple devices. However, in some implementations, the conferencing clients 1002 may include a single device and/or the external clients 1008 may include a single device. As shown, the conferencing clients 1002 and the external clients 1008 are separate and distinct. In some cases, at least one device may be both one of the conferencing clients 1002 and one of the external clients 1008.

As shown, the conferencing server 1004 includes a conferencing media engine 1010 and a streaming service gateway 1012. The streaming service gateway includes an external media adapter 1014. The external server 1006 includes an external data ingest engine 1016 and an external computation engine 1018. The external data ingest engine may be for ingesting external media or metadata.

The conferencing clients 1002 connect to a conference, such as an audio conference or a video conference, and engage in the conference using the conferencing media engine 1010. Data of the conference, for example, audio data, visual data, audiovisual data, text data, or data of interaction of the conferencing clients 1002 or the users thereof with the conferencing software is provided from the conferencing media engine 1010 to the streaming service gateway 1012. The streaming service gateway 1012 includes the external media adapter 1014. The external media adapter 1014 is used to communicate the data of the conference with external software or hardware. As shown, the external media adapter 1014 communicated the data of the conference to the external data ingest engine 1016. The external data ingest engine 1016 ingests the data of the conference and provides the data to the external computation engine 1018. The external computation engine 1018 executes software or hard-wired instructions on the data. For example, in an AI or ML context, the external computation engine 1018 may perform inference on the data. Alternatively, the external computation engine 1018 may use other statistical techniques to obtain information from the data. The results of the inference or the obtained information are provided to the external clients 1008 for storage, display, or further processing by the external clients 1008.

For conferences to which the external server 1006 has been given access rights, MSS allows for the external server 1006 to request a stream from a conference be sent with the ability to subscribe to specific content channels such as conference audio, video, content share, or in-conference chat to be sent to the external server 1006. A specific media format (e.g., audio or video codec) may also be requested.

The external data ingest engine 1016, using credentials obtained from an approved marketplace application added by the account administrator, or a custom application created by the account administrator, uses the MSS API to authenticate and to gain access to the conference. The external data ingest engine 1016 uses the MSS API to request its desired media channel (e.g., at least one of audio, video, shared content, or chat). The external data ingest engine 1016 uses the MSS API to specify the format (e.g., audio, video, or codec formatting). The external data ingest engine 1016 uses the MSS API to set the stream destination and transport protocol. The external data ingest engine 1016 uses the MSS API to initiate streaming from the conferencing server 1006 to the external data ingest engine 1016 in the requested channel and the requested format. The external data ingest engine 1016 forwards the ingested media or metadata to the external computation engine 1018.

MSS allows for notification to the external server 1006 and/or to the external data ingest engine 1016 via API/webhook that MSS is to begin streaming media to the external server 1006 and/or to the external data ingest engine 1016. Pre-configured streaming profiles may be configured for each external integration defined in MSS such that the correct streaming parameters are set so that the external server 1006 and/or to the external data ingest engine 1016 may receive appropriately formatted media in real-time (e.g., without any intentional delay but with some delay due to limitations of processing and/or network communication technology) and begin operation.

According to some implementations, the MSS API creates a webhook with the external data ingest engine 1016 to provide notifications. MSS sends, to the external data ingest engine 1016, a notification that a media streaming request has occurred. The external data ingest engine 1016 follows a stream initiation process, for example, as described above.

MSS includes software or hardware to receive and send media from the conference and to send and receive media and metadata formatted according to the requirements of the external server 1006 or the external data ingest engine 1016.

MSS may provide multiple APIs. The APIs may be capable of requesting a certain media type or channel of the conference. This may include channels such as audio, video, content, in-conference chat, questions and answer (Q&A) session outputs, polls, or other data associated with the conference. The APIs may be capable of requesting a certain media format or codec for a given channel. This may include open standards formatting which the conferencing server chooses to support, or proprietary formats which the conferencing server may support using an external software development kit (SDK).

Rather than sending all media channels in the conference, the MSS API may provide the ability for specific content channels such as audio, video, content or in-conference chat to be requested by the external data ingest engine 1016.

In one example use case, the external data ingest engine 1016 uses audio and have the audio formatted to a specific standard or codec. MSS invokes the external media adapter 1014 to appropriately format/transcode the media to the format requested by the external data ingest engine 1016. If the external data ingest engine 1016 uses chat messages (e.g., to implement an AI-enabled Q&A service), then the external data ingest engine 1016 may request the chat channel. In some uses cases, the external data ingest engine 1016 consumes video formatted using h.264, and pulse-code modulation (PCM) formatted audio. The external data ingest engine 1016 uses the API to request the appropriately formatted media from the streaming service gateway 1012. The external media adapter 1014 sends and/or receives the data using the requested format.

In some use cases, the external data ingest engine 1016 uses media formatted in a proprietary format. In these use cases, an SDK associated with the proprietary format may be used to perform media encapsulation for the external data ingest engine 1016. The SDK may reside at the conferencing server 1004, the external server 1006, or at other machines (e.g., an intermediary machine).

FIG. 10 illustrates a single external media adapter 1014. However, in some implementations, there may be multiple external media adapters (including the external media adapter 1014) for use simultaneously, in parallel, and/or serially. This allows the conference media to be sent or received with multiple external servers (including the external server 1006). In one use case, an entity using the system 1000 may have audio or video of a conference sent to a one external server. In parallel, the entity may have the audio stream sent to an AI-based specialized (e.g., for a specific industry such as medical or legal, which has specific industry jargon) transcription service and sent back to the conference as closed captions.

Figure 11:
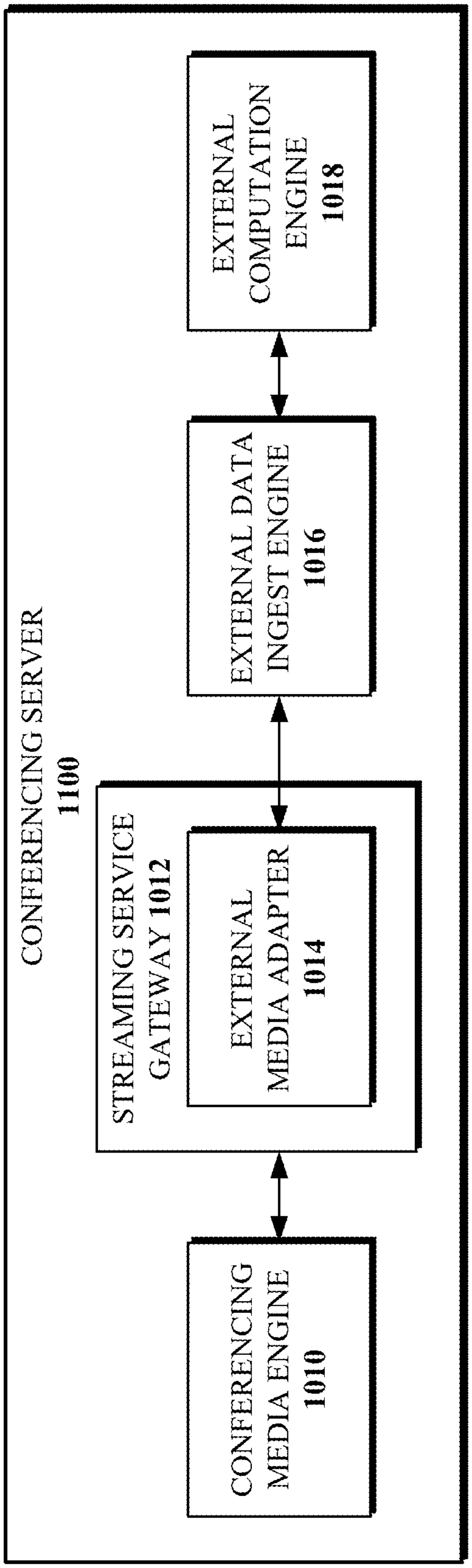
FIG. 11 is a block diagram of an example of a conferencing server.

FIG. 11 is a block diagram of an example of a conferencing server 1100. The conferencing server 1100 may be a server that provides conferencing services and may correspond to the conferencing server 402 or the conferencing server 1004. As illustrated, the conferencing server 1100 includes the conferencing media engine 1010, the streaming service gateway 1012 (which includes the external media adapter 1014), the external data ingest engine 1016, and the external computation engine 1018. It should be noted that the external data ingest engine 1016 and the external computation engine 1018 reside at the external server 1006 in FIG. 10, and reside at the conferencing server 1100 in FIG. 11, illustrating different implementations of the disclosed technology. Per the implementation shown in FIG. 11, the conferencing server 1100 includes the external data ingest engine 1016 and the external computation engine 1018, and performs some of the functionalities of these engines and/or some of the functionalities of the external server 1006 discussed in conjunction with FIG. 10.

FIG. 11 illustrates the streaming service gateway 1012 as including a single external media adapter 1014. In alternative implementations, the streaming service gateway 1012 may include multiple external media adapters (including the illustrated external media adapter 1014). Each of the multiple external media adapters may be connected to one of multiple external data ingest engines (including the external data ingest engine 1016). Each external data ingest engine may be connected to one of multiple external computation engines (including the external computation engine 1018).

MSS includes the ability to receive or send media from the conference and send or receive media and metadata formatted according to the requirements of the external system. The external system may include at least one of the external server 1006, the external data ingest engine 1016, or the eternal computation engine 1018.

In some example use cases, the use of the external system may be useful for regulatory, policy, or best practice reasons for a given conference. If the stream fails to be received by the external system, the conference may be stopped (e.g., to avoid compliance issues). Alternatively, the conference may be continued, and the media may be recorded for later consumption by the external system. This may be done where compliance does not mandate real-time consumption or usage, and a delayed output from the external system is acceptable.

In the situation where the conference is stopped, a notification may be sent out to the conferencing clients 1002 connected to the conference (or, in some cases, to the conference host device or to the system administrator device) that the stream to the external system has stopped and the conference is to be stopped. The conferencing server 1004, 1100 may include administrative policy controls to allow the conference to be stopped manually or automatically after a short (e.g., 30 second, 1 minute, or 2 minute) warning period.

In the situation where the conference is to be recorded, if the communication between the external media adapter 1014 and the external data ingest engine 1016 is disrupted, a warning message may be displayed in the graphical user interface of the conference (to all or a portion of the conferencing clients 1002 connected to the conference) indicating that the stream the external data ingest engine has been interrupted, but that the conference is to be recorded and the conference media is to be submitted to the external data ingest engine 1016 when connectivity is restored. Recording of the conference may start if the conference was not already being recorded. When the conference ends, the media recording may be cached by the conferencing server 1004, 1100 until connectivity to the external data ingest engine 1016 is restored. The recording may be transferred to the external data ingest engine 1016 for processing after the conference is over (or for non-real-time processing if the conference is still ongoing).

In some cases, it may be desirable to encrypt the stream at the application layer. One exchange process may be invoked to ensure the third-party system can decrypt the additional layer of encryption implemented between the external media adapter 1014 and the external data ingest engine 1016. This may use key exchange techniques or encryption techniques, or this may use an external SDK.

Metadata describing the media stream is also sent programmatically to allow correlation of the various media channels with the media coming from the conferencing clients 1002 in the conference. For example, the metadata could indicate which of the conferencing clients 1002 is speaking, actively sending video, performing a content share, or sending in-conference chat messages. If video or audio is sent, the metadata may include which resolutions are available. The metadata stream may include general conference metadata as well as metadata around the continued interaction of MSS and the external data ingest engine 1016 which can be used to ensure the third-party system is functioning properly. There may be use-cases that the external data ingest engine 1016 is to be functional during the conference, so connectivity status may be tracked and reported.

The external media adapter may send change notifications to the external data ingest engine 1016 to inform it that channel or format changes to the stream are going to or are occurring via webhook. For example, if a content share starts during the conference, then a notification is sent that an additional channel is available in the stream. Another example may be a notification that the video media stream has changed focus to a different participant or a different video resolution.

The external data ingest engine 1016 may use the MSS API to request changes to media channel/format settings during the conference if desired. For example, if the third-party had originally requested chat messages, it could request other media channels (such as the audio stream) if needed during the conference.

Some implementations relate to returning data from the external data ingest engine 1016 to the external media adapter 1014. It may be useful for the external data ingest engine 1016 to return data to the conference via the external media adapter 1014 or directly to the external media adapter 1014. This return data may take the form of real-time media, used for in-conference purposes, or non-real-time data for management, statistical or other reasons. The external data ingest engine 1016 invokes MSS APIs for interaction with the external media adapter 1014.

The external data ingest engine 1016 processes media streamed by the external media adapter 1014 and creates an output from this system. The external data ingest engine 1016 may return processed audio, video, content or other conference data back to the external media adapter 1014 to be sent into the conference. The external media adapter 1014 may use its transcoding/reformatting function to convert media to the proper format for use in the conference.

In some use cases, the external data ingest engine 1016 interacts with a conference and creates an output such as generative-AI video sign language interpretation, real-time closed captions, a specialized transcription for certain industries (e.g., healthcare or legal), or it may take the media stream, reformat it, and broadcast it out into the conference or to other third-party applications using a different protocol.

It may be desirable for the output of external computation engine 1018 to be used for real-time in-conference purposes, such as real-time transcription being sent back into the conference or an generative-AI chat message sent back into the conference to respond to a chat or audible question, either explicitly invoked or automatically invoked. For example, a question or statement in a chat message could be analyzed and responded to by an external AI engine executing at the external computation engine 1018. An audible statement or question might be made and a response may be automatically generated by the external computation engine 1018.

Some reasons that the external data ingest engine 1016 may return data to the external media adapter 1014 might be for conference or service management or notification purposes. If the external computation engine 1018 reaches capacity or has an availability problem, a message might be sent to the external media adapter 1014 indicating that it can no longer process the media stream. In some cases, compliance rules or best practices might enforce use of the external computation engine 1018. In some cases, the conference may be discontinued if the external computation engine 1018 is unable to perform its function. Depending on policy, an in-conference notification might be sent to the conferencing clients 1002 connected to the conference, indicating that the conference is discontinued due to loss of connectivity to the external data ingest engine 1016.

In addition, the external computation engine 1018 may return metadata including, for example, usage statistics, performance data of the external computation engine 1018 or other metadata. The other metadata may be specified by a user.

Content policies to control which specific media channels and formats as well as application-layer encryption may be configured in a MSS management interface, accessible via the external clients 1008, so that a user of the external clients 1008 might be allowed to request or receive certain types or formats of media which the system administrator may restrict or allow.

User policies, configured via the external clients 1008, control how MSS is invoked. This may involve providing the ability to define outputs associated with conferences, and to identify the users that may access the MSS management interface (e.g., the conference host). These policies also control which content policies are applied to the stream and which streaming controls are exposed to the users. Examples of policy controls exposed to the user may include allowing the user to start, stop, and/or pause streaming during the conference; enforcement of streaming use, which could be set to auto-start, or start in response to a user request before continuing the conference (e.g., to confirm user consent). Notification policies configure whether users are notified that MSS is streaming media. This may be based on company policy or government regulation.

If a policy is set to allow MSS streaming controls in the conference, the host of the conference has controls to stop, start, and/or pause MSS streaming. This may be useful in a situation where the conference host is to get consent from the participants of the conference, who may be notified, via their conferencing clients 1002, through in-conference notifications that MSS is streaming the conference media to the external data ingest engine 1016 (e.g., at the external server 1006 or the conferencing server 1100) if informed consent is to be obtained prior to the MSS streaming.

In addition to the implementations illustrated in FIGS. 10-11, MSS may be deployed using different cloud computing scenarios, as illustrated, for example, in FIGS. 12-15.

Figure 12:
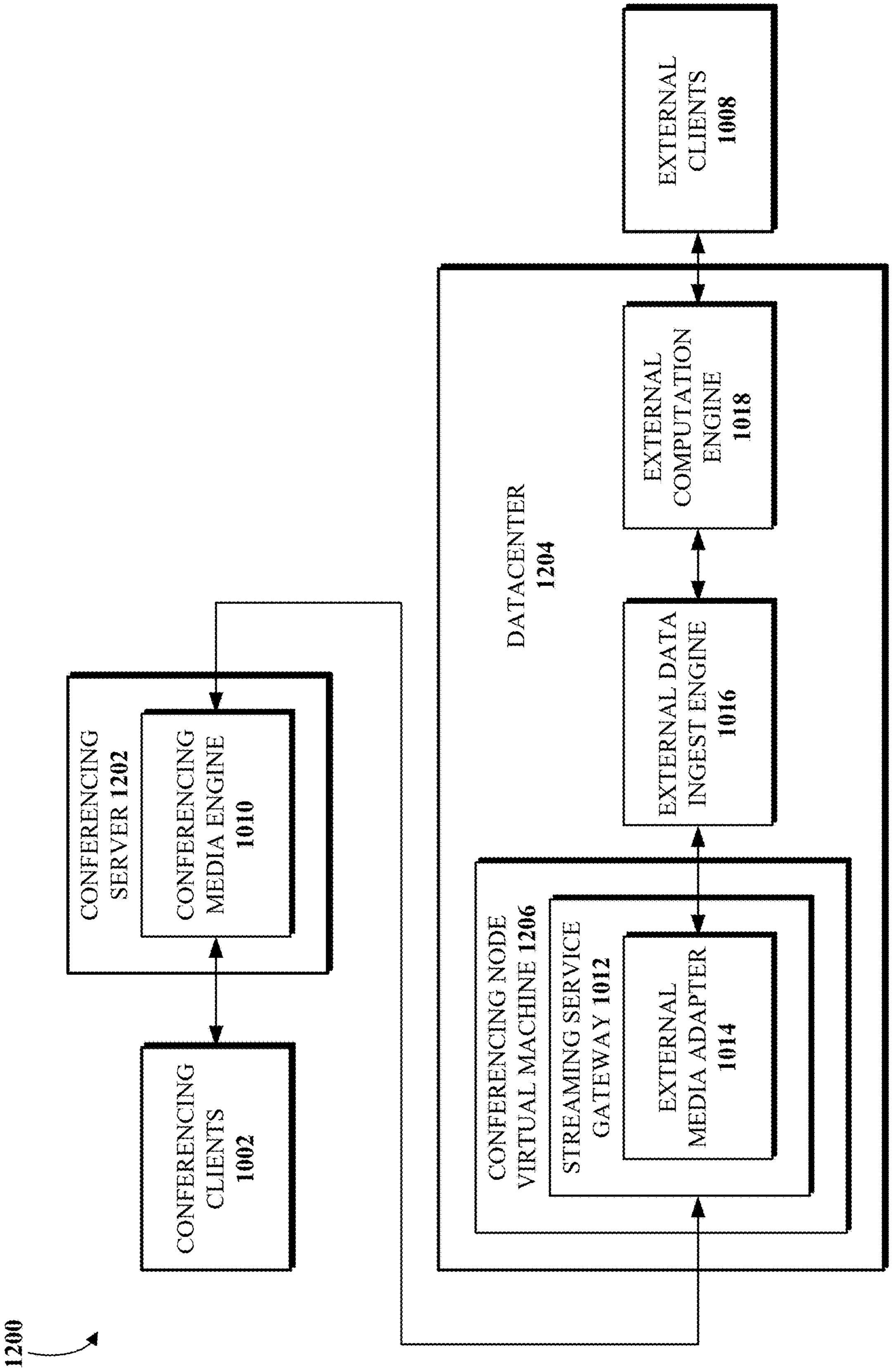
FIG. 12 is a block diagram of a second example of a system for processing conference multimedia data.

FIG. 12 is a block diagram of an example of a system 1200 for processing conference multimedia data. As shown, the system 1200 includes a conferencing server 1202 and a datacenter 1204, along with the conferencing clients 1002 and the external clients 1008, as described in conjunction with FIG. 10. The conferencing server 1202 may be a server that provides conferencing services and may correspond to the conferencing server 402, the conferencing server 1004, or the conferencing server 1100. The datacenter 1204 may be a cloud datacenter and may include one or more data repositories (e.g., databases). The datacenter 1204 may correspond to the datacenter 106.

As illustrated, the conferencing server 1202 includes the conferencing media engine 1010. The datacenter 1204 includes a conferencing node virtual machine 1206. The conferencing node virtual machine 1206, includes the streaming service gateway 1012, which includes the external media adapter 1014. The conferencing node virtual machine 1206 is a virtual machine that provides the services of a conferencing node. The datacenter 1204 further includes the external data ingest engine 1016 and the external computation engine 1018.

The conferencing node virtual machine 1206 is a virtual machine that provides the services of a conferencing node. A virtual machine (VM) is a software emulation of a physical computer (e.g., a physical conferencing node) that runs its own operating system and can execute applications, just like a physical machine. It is created using software called a hypervisor, which allows multiple VMs to run in the cloud, for example, on a single physical host or on multiple physical hosts.

The conferencing node VM is a specialized type of virtual machine designed to handle the tasks of a conferencing node. A conferencing node is a server or a node (e.g., an on-premises node on the premises of an entity that uses conferencing services) that connects and facilitates communication between multiple participants in a conference. It manages the audio and video streams, handles user authentication, and ensures a seamless experience for the participants at the conferencing clients 1002.

The conferencing node virtual machine 1206 provides a secure and isolated environment for the conferencing software to run, allowing it to operate in the datacenter 1204 independently from other VMs or physical machines. This separation can help improve system stability, security, and reliability, as well as simplify management and maintenance.

As illustrated in FIG. 12, the streaming service gateway 1012, including the external media adapter 1014, may be deployed in the cloud. In the cloud, the streaming service gateway 1012 receives media from the conferencing server 1202, performs its functions and sends the media stream to the external data ingest engine 1016 which is also deployed in the cloud.

Figure 13:
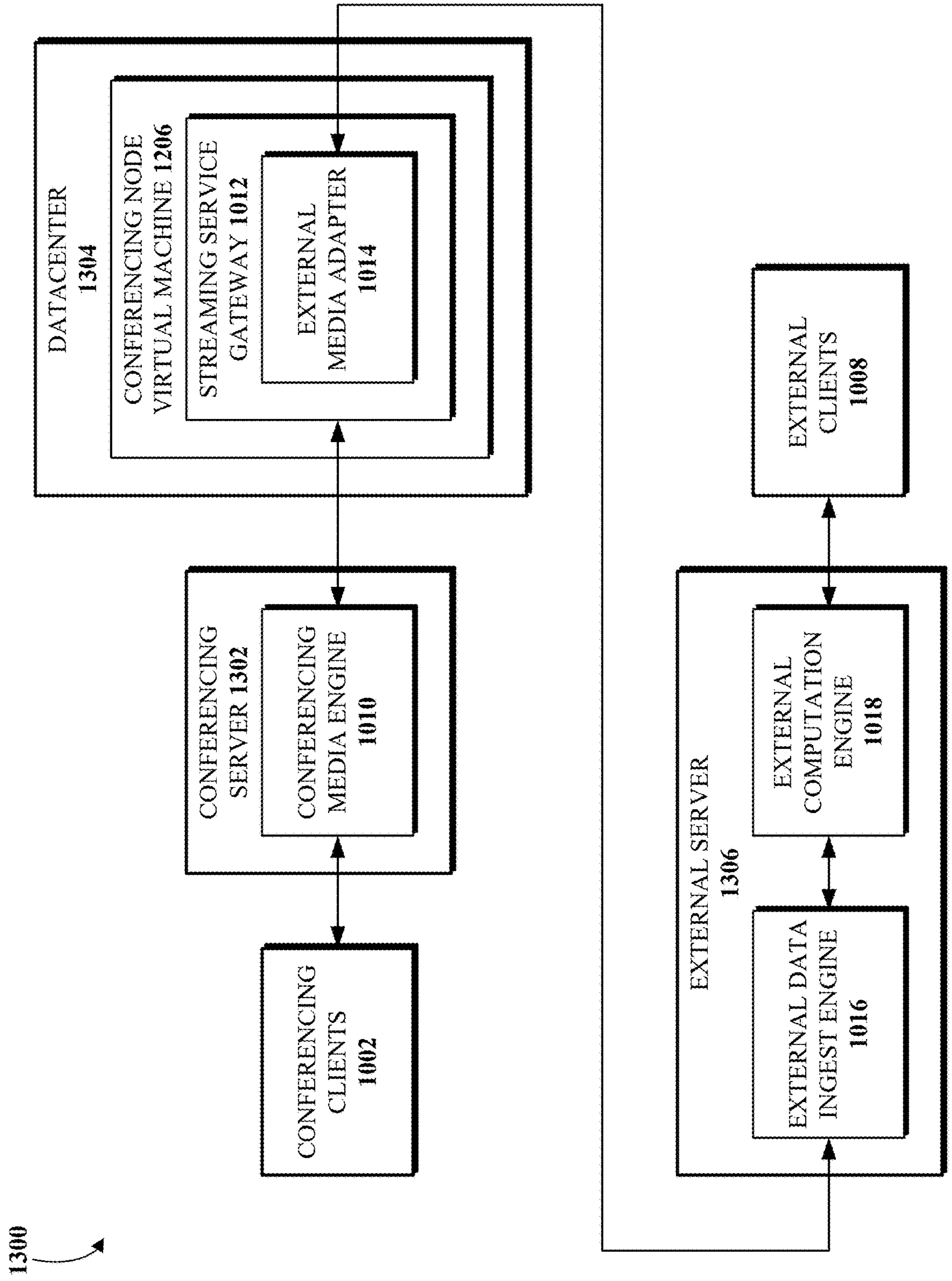
FIG. 13 is a block diagram of a third example of a system for processing conference multimedia data.

FIG. 13 is a block diagram of an example of a system 1300 for processing conference multimedia data. As shown in FIG. 13, the conferencing clients 1002 are connected to a conferencing server 1302 that includes the conferencing media engine 1010. The conferencing server 1302 is connected to a datacenter 1304 (e.g., a cloud datacenter, which may correspond to the datacenter 106). The datacenter 1304 includes the conferencing node virtual machine 1206. The conferencing node virtual machine 1206 includes the streaming service gateway 1012, which includes the external media adapter 1014. The datacenter is connected to an external server 1306. The external server 1306 includes the external data ingest engine 1016 and the external computation engine 1018. The external server 1306 is connected to the external clients 1008.

FIG. 13 illustrates an example of a hybrid-to-cloud deployment of some implementations. As shown in FIG. 13, the streaming service gateway 1012 may be deployed in the conferencing node virtual machine 1206, which resides in the datacenter 1304. According to this deployment, the streaming service gateway 1012 received data associated with the conference from the conferencing server 1302, modifies the data according to the format requested by the external data ingest engine 1016, and forwards the modified data to the external data ingest engine 1016. The external data ingest engine 1016 and the external computation engine 1018 executed at the external server 1306, which may be inaccessible to an entity associated with the conferencing server 1302 and/or the datacenter 1304 (e.g., an entity that provides conferencing services). In some examples, the external server 1306 is an on-premises server of a customer of the entity that provides conferencing services and controls the conferencing server 1302.

Figure 14:
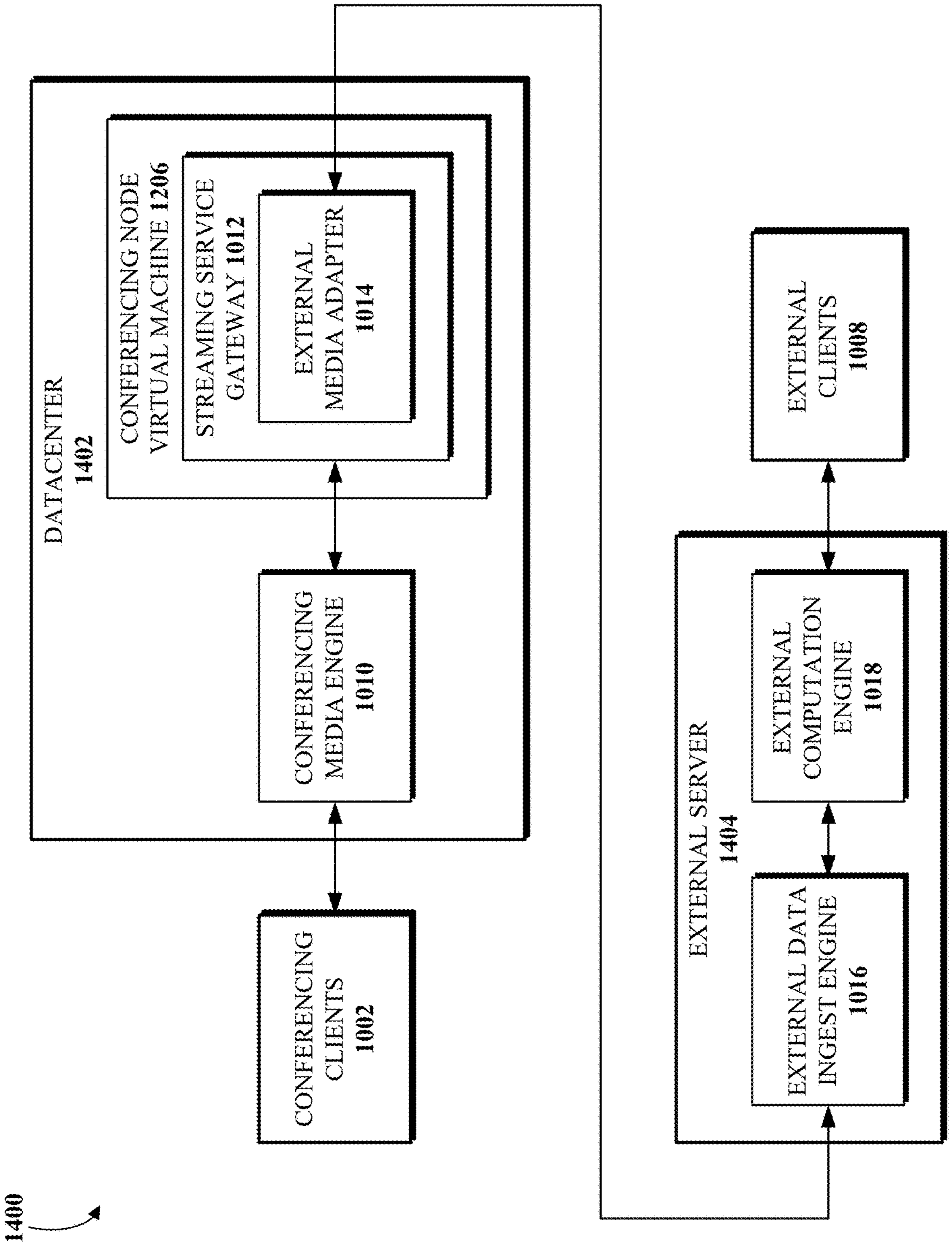
FIG. 14 is a block diagram of a fourth example of a system for processing conference multimedia data.

FIG. 14 is a block diagram of an example of a system 1400 for processing conference multimedia data. As shown, the conferencing clients 1002 are connected to a datacenter 1402. The datacenter 1402 is connected to an external server 1404. The external server 1404 is connected to the external clients 1008.

The datacenter 1402 may be a cloud datacenter and may correspond to the datacenter 106. As illustrated, the datacenter includes the conferencing media engine 1010 and the conferencing node virtual machine 1206. The conferencing node virtual machine 1206 includes the streaming service gateway 1012, which includes the external media adapter 1014. The external server 1404, similar to the external server 1306, includes the external data ingest engine 1016 and the external computation engine 1018.

FIG. 14 corresponds to a hybrid conference implementation of some aspects of the disclosed technology. As shown in FIG. 14, the streaming service gateway 1012 is deployed in the datacenter 1402. The datacenter 1402 which may belong to a customer of the entity operating the conferencing service, for example, an entity associated with the external server 1404. The datacenter 1402 may correspond to a private cloud. The streaming service gateway 1012 received conference data (e.g., media or metadata) from the conferencing media engine 1010. The streaming service gateway 1012 performs the functions described herein and sends data, via the external media adapter 1014, to the external data ingest engine 1016. The external server 1404, which includes the external data ingest engine 1016, may be an on-premises server of the customer, allowing the customer to maintain its privacy from the entity operating the conferencing service and/or other entities.

Figure 15:
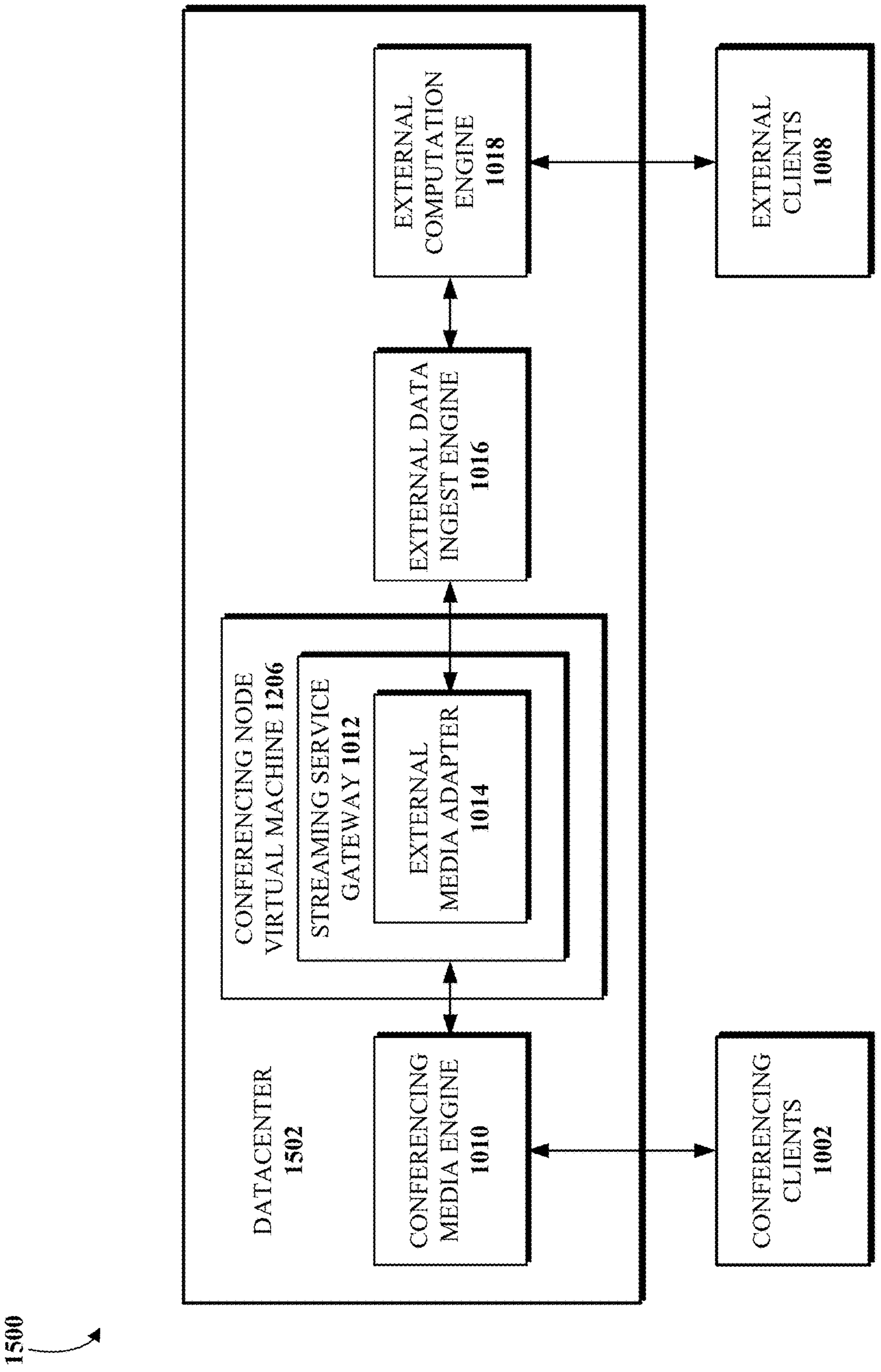
FIG. 15 is a block diagram of a fifth example of a system for processing conference multimedia data.

FIG. 15 is a block diagram of an example of a system 1500 for processing conference multimedia data. As shown, the system 1500 includes the conferencing clients 1002 connected to a datacenter 1502, which is connected to the external clients 1008. The datacenter 1502 may correspond to the datacenter 106. The datacenter 1502 may correspond to a private cloud of a customer of the entity providing conferencing services, allowing for the customer to have privacy from the entity and/or other entities.

As shown, the datacenter 1502 includes the conferencing media engine 1010, the conferencing node virtual machine 1206, the external data ingest engine 1016, and the external computation engine 1018. The conferencing node virtual machine 1206 includes the streaming service gateway 1012. The streaming service gateway 1012 includes the external media adapter 1014. The datacenter 1502 may be a cloud datacenter or an on-premises datacenter of the customer, allowing the customer to fully control the data stored thereon.

FIG. 16 illustrates the technique 1600 for processing conference multimedia data. The technique 1600 may be performed using a streaming service gateway, for example, the streaming service gateway 1012, which may reside at the conferencing server 1004, 1100 or at the datacenter 1204, 1304, 1402, 1502.

At 1602, the streaming service gateway obtains streaming multimedia data associated with a conference. The streaming multimedia data may include at least one of audio data, visual data, audiovisual data, text data, or data associated with user interaction with conferencing software. Some of the streaming multimedia data may be obtained from client devices (e.g., the conferencing clients 1002) connected to the conference. Some of the streaming multimedia data may be generated by software or hardware (e.g., at least one of artificial intelligence software or hardware, software or hardware for identifying a current speaker, or software or hardware for generating a virtual background) executing at the conferencing server.

At 1604, the streaming service gateway obtains a request for a portion of the streaming multimedia data from an external ingest engine. The external ingest engine may be the external data ingest engine 1016, which may reside at the external server 1006, 1306, the conferencing server 1100, 1404, or the datacenter 1204, 1502. The request identifies the portion of the streaming multimedia data and a format for the portion. In some cases, the request identifies metadata of the streaming multimedia data for provision to the external ingest engine. The portion of the streaming multimedia data may include at least one of audio data, visual data, text data, or data associated with user interaction with conferencing software. The portion of the streaming multimedia data may include multimedia data from a specified subset of client devices connected to the conference. According to some examples, the streaming service gateway is at the conferencing server, and the external ingest engine is at the external server. The external server may be a consumer server of a consumer of conferencing services. The consumer may be, for example, a business customer of an entity that provides conferencing services.

At 1606, the streaming service gateway transmits, to the external ingest engine and during the conference, the portion of the streaming multimedia data in the format according to the request. In some cases, the streaming service gateway establishes, in response to the request, a secure connection to the external ingest engine using a security protocol (e.g., a key exchange protocol such as Diffie-Hellman key exchange). The portion of the streaming multimedia data is transmitted using the secure connection.

According to some examples, the streaming service gateway obtains, during the conference and from the external ingest engine, a signal to change the portion of the streaming multimedia data or the format. The streaming service gateway transmits, to the external ingest engine, the portion of the streaming multimedia data in the format according to the signal.

As described above, according to some examples, the streaming service gateway is at the conferencing server, and the external ingest engine is at the external server. In some example uses cases, the external server is a transcription server that generates a transcript based on the streaming multimedia data and transmits the transcript to the conferencing server or to a data repository.

In some example use cases, the external server is a question answering server that uses a transformer engine to identify a question from the streaming multimedia data and generate an answer to the question. The conferencing server transmits the answer to a client device connected to the conference.

In some example use cases, the external server is a closed captioning server that generates captions for the conference and transmits the generated captions to the conferencing server. The conferencing server transmits the generated captions to a client device connected to the conference.

In some example use cases, the external server is a translation server that generates a translation for the conference and transmits the generated translation to the conferencing server. The conferencing server transmits the generated translation to a client device connected to the conference.

In some example use cases, the streaming multimedia data includes video. Transmitting the portion of the multimedia data causes the external server to generate modified video or metadata based on the video and to transmit the modified video or the metadata back to the conferencing server. The conferencing server transmits the modified video or the metadata to at least one client device connected to the conference.

Some implementations are described below as numbered examples (Example 1, 2, 3, etc.). These examples are provided as examples only and do not limit the other implementations disclosed herein.

Example 1 is a method comprising: obtaining, by a conferencing server, streaming multimedia data associated with a conference; obtaining, by the conferencing server, a request for a portion of the streaming multimedia data from an external server, the request identifying the portion of the streaming multimedia data and a format for the portion; and transmitting, by the conferencing server to the external server and during the conference, the portion of the streaming multimedia data in the format according to the request.

In Example 2, the subject matter of Example 1 includes, wherein the streaming multimedia data comprises at least one of audio data, visual data, text data, or data associated with user interaction with conferencing software.

In Example 3, the subject matter of Examples 1-2 includes, wherein at least a portion of the streaming multimedia data is obtained from client devices connected to the conference.

In Example 4, the subject matter of Examples 1-3 includes, wherein at least a portion of the streaming multimedia data is generated by an artificial intelligence engine of the conferencing server.

In Example 5, the subject matter of Examples 1-4 includes, wherein the request identifies metadata of the streaming multimedia data for provision to the external server.

In Example 6, the subject matter of Examples 1-5 includes, establishing, by the conferencing server and in response to the request, a secure connection to the external server using a security protocol, wherein the portion of the streaming multimedia data is transmitted using the secure connection, wherein the security protocol comprises a key exchange.

In Example 7, the subject matter of Examples 1-6 includes, obtaining, during the conference and from the external server, a signal to change the portion of the streaming multimedia data or the format; and transmitting, by the conferencing server to the external server, the portion of the streaming multimedia data in the format according to the signal.

In Example 8, the subject matter of Examples 1-7 includes, wherein the portion of the streaming multimedia data comprises at least one of audio data, visual data, text data, or data associated with user interaction with conferencing software.

In Example 9, the subject matter of Examples 1-8 includes, wherein the portion of the streaming multimedia data comprises multimedia data from a specified subset of client devices connected to the conference.

In Example 10, the subject matter of Examples 1-9 includes, wherein the external server comprises a consumer server.

In Example 11, the subject matter of Examples 1-10 includes, wherein the external server comprises a transcription server that generates a transcript based on the streaming multimedia data and transmits the transcript to the conferencing server or to a data repository.

In Example 12, the subject matter of Examples 1-11 includes, wherein the external server comprises a question answering server that uses a transformer engine to identify a question from the streaming multimedia data and generate an answer to the question, wherein the external server transmits the generated answer to the conferencing server, the method further comprising: transmitting, by the conferencing server, the answer to a client device connected to the conference.

In Example 13, the subject matter of Examples 1-12 includes, wherein the external server comprises a closed captioning server that generates captions for the conference and transmits the generated captions to the conferencing server, the method further comprising: transmitting, by the conferencing server, the generated captions to a client device connected to the conference.

In Example 14, the subject matter of Examples 1-13 includes, wherein the external server comprises a translation server that generates a translation for the conference and transmits the generated translation to the conferencing server, the method further comprising: transmitting, by the conferencing server, the generated translation to a client device connected to the conference.

Example 15 is a non-transitory computer readable medium storing instructions operable to cause one or more processors to perform operations comprising: obtaining, by a conferencing server, streaming multimedia data associated with a conference; obtaining, by the conferencing server, a request for a portion of the streaming multimedia data from an external server, the request identifying the portion of the streaming multimedia data and a format for the portion; and transmitting, by the conferencing server to the external server and during the conference, the portion of the streaming multimedia data in the format according to the request.

In Example 16, the subject matter of Example 15 includes, wherein the streaming multimedia data comprises at least one of audio data, visual data, text data, or data associated with user interaction with conferencing software.

In Example 17, the subject matter of Examples 15-16 includes, wherein at least a portion of the streaming multimedia data is obtained from client devices connected to the conference.

In Example 18, the subject matter of Examples 15-17 includes, wherein at least a portion of the streaming multimedia data is generated by an artificial intelligence engine of the conferencing server.

In Example 19, the subject matter of Examples 15-18 includes, wherein the request identifies metadata of the streaming multimedia data for provision to the external server.

In Example 20, the subject matter of Examples 15-19 includes, the operations further comprising: establishing, by the conferencing server and in response to the request, a secure connection to the external server using a security protocol, wherein the portion of the streaming multimedia data is transmitted using the secure connection, wherein the security protocol comprises a key exchange.

In Example 21, the subject matter of Examples 15-20 includes, the operations further comprising: obtaining, during the conference and from the external server, a signal to change the portion of the streaming multimedia data or the format; and transmitting, by the conferencing server to the external server, the portion of the streaming multimedia data in the format according to the signal.

In Example 22, the subject matter of Examples 15-21 includes, wherein the portion of the streaming multimedia data comprises at least one of audio data, visual data, text data, or data associated with user interaction with conferencing software.

In Example 23, the subject matter of Examples 15-22 includes, wherein the portion of the streaming multimedia data comprises multimedia data from a specified subset of client devices connected to the conference.

In Example 24, the subject matter of Examples 15-23 includes, wherein the external server comprises a consumer server.

In Example 25, the subject matter of Examples 15-24 includes, wherein the external server comprises a transcription server that generates a transcript based on the streaming multimedia data and transmits the transcript to the conferencing server or to a data repository.

In Example 26, the subject matter of Examples 15-25 includes, wherein the external server comprises a question answering server that uses a transformer engine to identify a question from the streaming multimedia data and generate an answer to the question, wherein the external server transmits the generated answer to the conferencing server, the operations further comprising: transmitting, by the conferencing server, the answer to a client device connected to the conference.

In Example 27, the subject matter of Examples 15-26 includes, wherein the external server comprises a closed captioning server that generates captions for the conference and transmits the generated captions to the conferencing server, the operations further comprising:

transmitting, by the conferencing server, the generated captions to a client device connected to the conference.

In Example 28, the subject matter of Examples 15-27 includes, wherein the external server comprises a translation server that generates a translation for the conference and transmits the generated translation to the conferencing server, the operations further comprising: transmitting, by the conferencing server, the generated translation to a client device connected to the conference.

Example 29 is a system, comprising: a memory subsystem storing instructions; and processing circuitry configured to execute the instructions to: obtain, by a conferencing server, streaming multimedia data associated with a conference; obtain, by the conferencing server, a request for a portion of the streaming multimedia data from an external server, the request identifying the portion of the streaming multimedia data and a format for the portion; and transmit, by the conferencing server to the external server and during the conference, the portion of the streaming multimedia data in the format according to the request.

In Example 30, the subject matter of Example 29 includes, wherein the streaming multimedia data comprises at least one of audio data, visual data, text data, or data associated with user interaction with conferencing software.

In Example 31, the subject matter of Examples 29-30 includes, wherein at least a portion of the streaming multimedia data is obtained from client devices connected to the conference.

In Example 32, the subject matter of Examples 29-31 includes, wherein at least a portion of the streaming multimedia data is generated by an artificial intelligence engine of the conferencing server.

In Example 33, the subject matter of Examples 29-32 includes, wherein the request identifies metadata of the streaming multimedia data for provision to the external server.

In Example 34, the subject matter of Examples 29-33 includes, the processing circuitry configured to execute the instructions to: establish, by the conferencing server and in response to the request, a secure connection to the external server using a security protocol, wherein the portion of the streaming multimedia data is transmitted using the secure connection, wherein the security protocol comprises a key exchange.

In Example 35, the subject matter of Examples 29-34 includes, the processing circuitry configured to execute the instructions to: obtain, during the conference and from the external server, a signal to change the portion of the streaming multimedia data or the format; and transmit, by the conferencing server to the external server, the portion of the streaming multimedia data in the format according to the signal.

In Example 36, the subject matter of Examples 29-35 includes, wherein the portion of the streaming multimedia data comprises at least one of audio data, visual data, text data, or data associated with user interaction with conferencing software.

In Example 37, the subject matter of Examples 29-36 includes, wherein the portion of the streaming multimedia data comprises multimedia data from a specified subset of client devices connected to the conference.

In Example 38, the subject matter of Examples 29-37 includes, wherein the external server comprises a consumer server.

In Example 39, the subject matter of Examples 29-38 includes, wherein the external server comprises a transcription server that generates a transcript based on the streaming multimedia data and transmits the transcript to the conferencing server or to a data repository.

In Example 40, the subject matter of Examples 29-39 includes, wherein the external server comprises a question answering server that uses a transformer engine to identify a question from the streaming multimedia data and generate an answer to the question, wherein the external server transmits the generated answer to the conferencing server, the processing circuitry configured to execute the instructions to: transmit, by the conferencing server, the answer to a client device connected to the conference.

In Example 41, the subject matter of Examples 29-40 includes, wherein the external server comprises a closed captioning server that generates captions for the conference and transmits the generated captions to the conferencing server, the processing circuitry configured to execute the instructions to: transmit, by the conferencing server, the generated captions to a client device connected to the conference.

In Example 42, the subject matter of Examples 29-41 includes, wherein the external server comprises a translation server that generates a translation for the conference and transmits the generated translation to the conferencing server, the processing circuitry configured to execute the instructions to: transmit, by the conferencing server, the generated translation to a client device connected to the conference.

Example 43 is a method, comprising: receiving, at a conferencing server, audio data from devices connected to a conference; generating, at the conferencing server, multiple time-contiguous containers, each time-contiguous container including an identifier of an associated device of the devices and one or more payloads of the audio data from the associated device, each payload having a predefined time length; and transmitting the multiple time-contiguous containers to a consumer server.

In Example 44, the subject matter of Example 43 includes, wherein generating the multiple time-contiguous containers comprises terminating generation of a first time-contiguous container of the multiple time-contiguous containers and initiating generation of a second time-contiguous container of the multiple time-contiguous containers in response to at least one of: generating a predetermined number of payloads in the first time-contiguous container, a passage of a preset time period since initiating generation of the first time-contiguous container, or detecting audio from a device of the devices that is different from the associated device.

In Example 45, the subject matter of Examples 43-44 includes, wherein each time-contiguous container of the multiple time-contiguous containers is associated with a time range, wherein time ranges of the multiple time-contiguous containers are mutually exclusive.

In Example 46, the subject matter of Examples 43-45 includes, wherein each time-contiguous container comprises the audio data from the associated device and lacks audio from devices different from the associated device.

In Example 47, the subject matter of Examples 43-46 includes, detecting simultaneous audio from two or more of the devices; and generating a time-contiguous container of the multiple time-contiguous containers, wherein the time-contiguous container comprises identifiers of the two or more of the devices and the one or more payloads of the audio data from the two or more of the devices.

In Example 48, the subject matter of Examples 43-47 includes, detecting simultaneous audio from two or more of the devices; and selecting one of the two or more of the devices for generating a container based on at least one of: the associated device of a currently-generated time-contiguous container of the multiple time-contiguous containers, the associated device of a previously-generated time-contiguous container of the multiple time-contiguous containers, a volume of the audio data from at least one of the two or more of the devices, or stored information about a user of the at least one of the two or more of the devices.

In Example 49, the subject matter of Examples 43-48 includes, wherein the consumer server comprises at least one of: a transcription server or an artificial intelligence inference server, and wherein the multiple time-contiguous containers are provided to the consumer server for processing at the consumer server.

In Example 50, the subject matter of Examples 43-49 includes, transmitting, to a management server, a signal that the conference is beginning; receiving, from the management server, an address of the consumer server and authentication data for the consumer server; connecting to the consumer server, to provide the multiple time-contiguous containers, using the received address and the authentication data.

In Example 51, the subject matter of Examples 43-50 includes, wherein a time-contiguous container of the multiple time-contiguous containers is provided to the consumer server in real-time after generating the time-contiguous container.

In Example 52, the subject matter of Examples 43-51 includes, wherein the conference is a video conference or an audio conference.

Example 53 is a non-transitory computer readable medium storing instructions operable to cause one or more processors to perform operations comprising: receiving, at a conferencing server, audio data from devices connected to a conference; generating, at the conferencing server, multiple time-contiguous containers, each time-contiguous container including an identifier of an associated device of the devices and one or more payloads of the audio data from the associated device, each payload having a predefined time length; and transmitting the multiple time-contiguous containers to a consumer server.

In Example 54, the subject matter of Example 53 includes, wherein generating the multiple time-contiguous containers comprises terminating generation of a first time-contiguous container of the multiple time-contiguous containers and initiating generation of a second time-contiguous container of the multiple time-contiguous containers in response to at least one of: generating a predetermined number of payloads in the first time-contiguous container or detecting audio from a device of the devices that is different from the associated device.

In Example 55, the subject matter of Examples 53-54 includes, wherein each time-contiguous container of the multiple time-contiguous containers is associated with a time range, wherein time ranges of the multiple time-contiguous containers are mutually exclusive and collectively exhaustive with respect to times in the conference when speech is detected.

In Example 56, the subject matter of Examples 53-55 includes, wherein each time-contiguous container comprises the audio data from the associated device.

In Example 57, the subject matter of Examples 53-56 includes, the operations comprising: detecting simultaneous audio from at least two of the devices; and generating a time-contiguous container of the multiple time-contiguous containers, wherein the time-contiguous container comprises identifiers of the at least two of the devices and the one or more payloads of the audio data from the at least two of the devices.

In Example 58, the subject matter of Examples 53-57 includes, the operations comprising: detecting simultaneous audio from at least two of the devices; and selecting one of the at least two of the devices for generating a container based on at least one of: the associated device of a currently-generated time-contiguous container of the multiple time-contiguous containers, the associated device of a previously-generated time-contiguous container of the multiple time-contiguous containers, a volume of the audio data from one or more of the at least two of the devices.

In Example 59, the subject matter of Examples 53-58 includes, the operations comprising: transmitting, to a management server, a signal that the conference is commencing; receiving, from the management server, authentication data for the consumer server; connecting to the consumer server, to provide the multiple time-contiguous containers, using the received authentication data.

Example 60 is a system, comprising: a memory subsystem; and processing circuitry configured to execute instructions stored in the memory subsystem to: receive, at a conferencing server, audio data from devices connected to a conference; generate, at the conferencing server, multiple time-contiguous containers, each time-contiguous container including an identifier of an associated device of the devices and one or more payloads of the audio data from the associated device, each payload having a predefined time length; and transmit the multiple time-contiguous containers to a consumer server.

In Example 61, the subject matter of Example 60 includes, wherein generating the multiple time-contiguous containers comprises terminating generation of a first time-contiguous container of the multiple time-contiguous containers and initiating generation of a second time-contiguous container of the multiple time-contiguous containers in response to at least one of: a passage of a preset time period since initiating generation of the first time-contiguous container or detecting audio from a device of the devices that is different from the associated device.

In Example 62, the subject matter of Examples 60-61 includes, wherein each time-contiguous container of the multiple time-contiguous containers is associated with a time range, wherein time ranges of the multiple time-contiguous containers are collectively exhaustive with respect to times in the conference when speech is detected.

Example 63 is a method comprising: obtaining, by a conferencing server, streaming multimedia data associated with a conference; obtaining, by the conferencing server, a request for a portion of the streaming multimedia data from an external server, the request identifying the portion and a format for the portion; and transmitting, by the conferencing server to the external server and during the conference, the portion of the streaming multimedia data in the format.

In Example 64, the subject matter of Example 63 includes, wherein the streaming multimedia data comprises at least one of audio data, visual data, text data, or data associated with user interaction with conferencing software.

In Example 65, the subject matter of Examples 63-64 includes, wherein at least some of the streaming multimedia data is obtained from client devices connected to the conference.

In Example 66, the subject matter of Examples 63-65 includes, wherein at least some of the streaming multimedia data is generated by an artificial intelligence engine of the conferencing server.

In Example 67, the subject matter of Examples 63-66 includes, wherein the request identifies metadata of the streaming multimedia data for provision to the external server.

In Example 68, the subject matter of Examples 63-67 includes, establishing, by the conferencing server, a secure connection to the external server using a key exchange security protocol, wherein the portion of the streaming multimedia data is transmitted using the secure connection.

In Example 69, the subject matter of Examples 63-68 includes, obtaining, during the conference and from the external server, a signal to change the portion of the streaming multimedia data or to change the format; and transmitting, by the conferencing server to the external server, the portion of the streaming multimedia data in the format according to the signal.

In Example 70, the subject matter of Examples 63-69 includes, wherein the portion of the streaming multimedia data comprises multimedia data from a specified subset of client devices connected to the conference.

In Example 71, the subject matter of Examples 63-70 includes, wherein the external server comprises a consumer server.

In Example 72, the subject matter of Examples 63-71 includes, wherein the external server comprises a transcription server that generates a transcript based on the streaming multimedia data and transmits the transcript to the conferencing server or to a data repository.

In Example 73, the subject matter of Examples 63-72 includes, wherein the external server comprises a question answering server that uses a transformer engine to identify a question from the streaming multimedia data and generate an answer to the question, wherein the external server transmits the generated answer to the conferencing server, the method further comprising: transmitting, by the conferencing server, the generated answer to a client device connected to the conference.

In Example 74, the subject matter of Examples 63-73 includes, wherein the external server comprises a closed captioning server that generates a caption for the conference and transmits the generated caption to the conferencing server, the method further comprising: transmitting, by the conferencing server, the generated caption to a client device connected to the conference.

In Example 75, the subject matter of Examples 63-74 includes, wherein the external server comprises a translation server that generates a translation for the conference and transmits the generated translation to the conferencing server, the method further comprising: transmitting, by the conferencing server, the generated translation to a client device connected to the conference.

In Example 76, the subject matter of Examples 63-75 includes, wherein the streaming multimedia data comprises video, wherein transmitting the portion of the multimedia data causes the external server to generate modified video or metadata based on the video and to transmit the modified video or the metadata to the conferencing server, the method further comprising: transmitting, by the conferencing server to at least one client device connected to the conference, the modified video or the metadata.

Example 77 is a non-transitory computer readable medium storing instructions operable to cause one or more processors to perform operations comprising: obtaining, by a conferencing server, streaming multimedia data associated with a conference; obtaining, by the conferencing server, a request for a portion of the streaming multimedia data from an external server, the request identifying the portion and a format for the portion; and transmitting, by the conferencing server to the external server and during the conference, the portion of the streaming multimedia data in the format.

In Example 78, the subject matter of Example 77 includes, wherein the portion of the streaming multimedia data comprises at least one of audio data, visual data, text data, or data associated with user interaction with conferencing software.

In Example 79, the subject matter of Examples 77-78 includes, wherein at least some of the streaming multimedia data is obtained from client devices.

In Example 80, the subject matter of Examples 77-79 includes, wherein at least some of the streaming multimedia data is generated by the conferencing server.

Example 81 is a system, comprising: a memory subsystem; and processing circuitry configured to execute instructions stored in the memory subsystem to: obtain, by a conferencing server, streaming multimedia data associated with a conference; obtain, by the conferencing server, a request for a portion of the streaming multimedia data from an external server, the request identifying the portion and a format for the portion; and transmit, by the conferencing server to the external server and during the conference, the portion of the streaming multimedia data in the format.

In Example 82, the subject matter of Example 81 includes, wherein the streaming multimedia data comprises at least one of audiovisual data, text data, or data associated with user interaction with conferencing software.

Example 83 is at least one machine-readable medium including instructions that, when executed by processing circuitry, cause the processing circuitry to perform operations to implement of any of Examples 1-82.

Example 84 is an apparatus comprising means to implement of any of Examples 1-82.

Example 85 is a system to implement of any of Examples 1-82.

Example 86 is a method to implement of any of Examples 1-82.

As used herein, unless explicitly stated otherwise, any term specified in the singular may include its plural version. For example, "a computer that stores data and runs software," may include a single computer that stores data and runs software or two computers—a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

As used herein, the term "real-time" may include an event occurring without any intentional delay. Some delay may still occur, for example, due to latency in the processing circuitry, the network interface, the network, or other components. In the phrase, "a computer transmits a signal in real-time after the computer calculates a value," the signal may be transmitted 10 milliseconds, one second, one minute, one hour, or several hours after the value is calculated, as long as the delay is due to latency in the processing circuitry, the network interface, the network, or another component, and there is no intentional delay programmed into the software or hard-wired into the hardware of the computer.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:

obtaining, by a conferencing server, streaming multimedia data associated with a conference;

obtaining, by the conferencing server, a request for a portion of the streaming multimedia data from an external server, the request identifying the portion and a media format for the portion, wherein the media format specifies at least one of a codec or a frame parameter, wherein the request further identifies the portion as comprising a selected channel of the streaming multimedia data, the selected channel being one or more of an audio channel, a video channel, a screen-sharing content channel, or an in-conference chat channel; and transmitting, by the conferencing server to the external server and during the conference, the portion of the streaming multimedia data in the media format.

2. The method of claim 1, wherein the streaming multimedia data comprises at least one of audio data, visual data, text data, or data associated with user interaction with conferencing software.

3. The method of claim 1, wherein at least some of the streaming multimedia data is obtained from client devices connected to the conference.

4. The method of claim 1, wherein at least some of the streaming multimedia data is generated by an artificial intelligence engine of the conferencing server.

5. The method of claim 1, wherein the request identifies metadata of the streaming multimedia data for provision to the external server.

6. The method of claim 1, further comprising:
establishing, by the conferencing server, a secure connection to the external server using a key exchange security protocol, wherein the portion of the streaming multimedia data is transmitted using the secure connection.

7. The method of claim 1, further comprising:
obtaining, during the conference and from the external server, a signal to change the portion of the streaming multimedia data or to change the media format; and
transmitting, by the conferencing server to the external server, the portion of the streaming multimedia data in the media format according to the signal.

8. The method of claim 1, wherein the portion of the streaming multimedia data comprises multimedia data from a specified subset of client devices connected to the conference.

9. The method of claim 1, wherein the external server comprises a consumer server.

10. The method of claim 1, wherein the external server comprises a transcription server that generates a transcript based on the streaming multimedia data and transmits the transcript to the conferencing server or to a data repository.

11. The method of claim 1, wherein the external server comprises a question answering server that uses a transformer engine to identify a question from the streaming multimedia data and generate an answer to the question, wherein the external server transmits the generated answer to the conferencing server, the method further comprising:
transmitting, by the conferencing server, the generated answer to a client device connected to the conference.

12. The method of claim 1, wherein the external server comprises a closed captioning server that generates a caption for the conference and transmits the generated caption to the conferencing server, the method further comprising:
transmitting, by the conferencing server, the generated caption to a client device connected to the conference.

13. The method of claim 1, wherein the external server comprises a translation server that generates a translation for the conference and transmits the generated translation to the conferencing server, the method further comprising:
transmitting, by the conferencing server, the generated translation to a client device connected to the conference.

14. The method of claim 1, wherein the streaming multimedia data comprises video, wherein transmitting the portion of the multimedia data causes the external server to generate modified video or metadata based on the video and to transmit the modified video or the metadata to the conferencing server, the method further comprising:
transmitting, by the conferencing server to at least one client device connected to the conference, the modified video or the metadata.

15. The method of claim 1, further comprising:
transcoding, by the conferencing server, the portion of the streaming multimedia data from an original format of the streaming multimedia data into the media format identified in the request to produce a transcoded portion, wherein the transcoded portion is the portion transmitted to the external server in the media format.

16. A non-transitory computer readable medium storing instructions operable to cause one or more processors to perform operations comprising:
obtaining, by a conferencing server, streaming multimedia data associated with a conference;
obtaining, by the conferencing server, a request for a portion of the streaming multimedia data from an external server, the request identifying the portion and a media format for the portion, wherein the media format specifies at least one of a codec or a frame parameter, wherein the request further identifies the portion as comprising a selected channel of the streaming multimedia data, the selected channel being one or more of an audio channel, a video channel, a screen-sharing content channel, or an in-conference chat channel; and
transmitting, by the conferencing server to the external server and during the conference, the portion of the streaming multimedia data in the media format.

17. The non-transitory computer readable medium of claim 16, wherein the portion of the streaming multimedia data comprises at least one of audio data, visual data, text data, or data associated with user interaction with conferencing software.

18. The non-transitory computer readable medium of claim 16, wherein at least some of the streaming multimedia data is obtained from client devices.

19. The non-transitory computer readable medium of claim 16, wherein at least some of the streaming multimedia data is generated by the conferencing server.

20. A system, comprising:
a memory subsystem; and
processing circuitry configured to execute instructions stored in the memory subsystem to:
obtain, by a conferencing server, streaming multimedia data associated with a conference;
obtain, by the conferencing server, a request for a portion of the streaming multimedia data from an external server, the request identifying the portion and a media format for the portion, wherein the media format specifies at least one of a codec or a frame parameter, wherein the request further identifies the portion as comprising a selected channel of the streaming multimedia data, the selected channel being one or more of an audio channel, a video channel, a screen-sharing content channel, or an in-conference chat channel; and
transmit, by the conferencing server to the external server and during the conference, the portion of the streaming multimedia data in the media format.

21. The system of claim 20, wherein the streaming multimedia data comprises at least one of audiovisual data, text data, or data associated with user interaction with conferencing software.

* * * * *